United States Patent
Longo et al.

(10) Patent No.: US 7,159,073 B2
(45) Date of Patent: Jan. 2, 2007

(54) DATA STORAGE AND CACHING ARCHITECTURE

(75) Inventors: Alan Longo, Boulder, CO (US); Glen Catalano, Longmont, CO (US); Brett Lammers, Longmont, CO (US); Glenn Alan Lott, Berthoud, CO (US); William Morgan Tempero, Longmont, CO (US); Aaron Wade Wilson, Berthoud, CO (US)

(73) Assignee: STMicroelectronics, Inc., Carrollton, TX (US)

( * ) Notice: Subject to any disclaimer, the term of this patent is extended or adjusted under 35 U.S.C. 154(b) by 548 days.

(21) Appl. No.: 10/401,507

(22) Filed: Mar. 27, 2003

(65) Prior Publication Data

US 2004/0205092 A1 Oct. 14, 2004

(51) Int. Cl.
*G06F 12/00* (2006.01)
(52) U.S. Cl. .................................... 711/113
(58) Field of Classification Search ................ 711/113
See application file for complete search history.

(56) References Cited

U.S. PATENT DOCUMENTS

| 5,261,066 A | 11/1993 | Jouppi |
| 5,860,131 A | 1/1999 | Daub |
| 5,920,887 A | 7/1999 | Sokolov |
| 5,970,508 A | 10/1999 | Howe et al. |
| 6,047,357 A | 4/2000 | Bannon et al. |
| 6,078,992 A | 6/2000 | Hum |
| 6,378,031 B1* | 4/2002 | Kuno et al. .................... 711/4 |
| 6,795,264 B1* | 9/2004 | Wilson ....................... 360/69 |
| 2002/0091895 A1* | 7/2002 | Haines et al. ............... 711/112 |
| 2003/0149815 A1* | 8/2003 | Williams et al. ............. 710/56 |

OTHER PUBLICATIONS

An Analysis of Division Algorithms and Implementations by Stuart F. Oberman & Michael J. Flynn Technical Report: CSL-TR-95-675 Jul. 1995.

* cited by examiner

*Primary Examiner*—Matthew Kim
*Assistant Examiner*—Shane M. Thomas
(74) *Attorney, Agent, or Firm*—Lisa K. Jorgenson; William J. Kubida

(57) ABSTRACT

An extent record for an extent based data buffer that includes a host pointer that links the extent record to a next host extent record of a host extent record set, and a storage device pointer that links the extent record to a next storage device extent record of a storage device extent record set. Also, a system for transferring data between a host and a storage device that includes a data buffer coupled to the host and the storage device, where memory in the data buffer is divided into one or more extents, an extent table associated with the data buffer, where the extent table includes at least one extent record, an LBA chain table coupled to the host and the extent table, and a track section table coupled to the storage device and the extent table.

17 Claims, 9 Drawing Sheets

DATA STORAGE AND CACHING ARCHITECTURE

BACKGROUND OF THE INVENTION

1. Field of the Invention

The present invention relates, in general, to the transfer of buffered data between a host and a data storage device. Specifically, the invention relates to methods and systems of extent-based cache memory management for the allocation of space in a data buffer.

2. Relevant Background

Data buffers may be used in data storage devices to facilitate the transfer of data between a host (e.g., a computer) and the storage device (e.g., a disk drive). The buffers, commonly constructed of Dynamic Random Access Memory (DRAM), provide a temporary data storage location to buffer data transfers between the host and the storage device.

The data space in a data buffer may be divided into one or more data segments. Segmented data buffers are well-suited as a data speed-matching device to buffer data between a host and a disk drive. However, when attempting to implement advanced cache and disk algorithms that improve data access performance, buffer segments have limitations.

One limitation is that buffer segments of fixed size often have a portion of their space go unused. This space, which cannot be allocated for other data uses, adversely impacts the storage density of the data buffer. Another limitation is that it is only possible to track a single sequence of LBAs in a segmented buffer with conventional methods of defining a Start LBA and using block counters to determine the length of the LBA chain. This too limits the storage density of a buffer because LBA chains must be stored in sequential segments in the buffer.

Still another limitation with conventional segmented buffers arises because data segments are not transferred out of sequential order to and from the buffer. This is not as much of a limitation for transfers from the host to the data buffer because host data is almost always stored in chains of sequential LBAs. However, transfers of sequential data segments between the buffer and a hard disk are often much less efficient because sequential LBA data may be stored on different tracks of the disk. These and other limitations of the conventional segmented data buffers are addressed by the present invention.

SUMMARY OF THE INVENTION

An embodiment of the present invention includes an extent record for an extent based data buffer which comprises a host pointer that links the extent record to a next host extent record of a host extent record set, and a storage device pointer that links the extent record to a next storage device extent record of a storage device extent record set.

Another embodiment of the invention includes a system for transferring data between a host and a storage device which comprises a data buffer coupled to the host and the storage device, wherein memory in the data buffer is divided into one or more extents, an extent table associated with the data buffer, wherein the extent table comprises at least one extent record, an LBA chain table coupled to the host and the extent table, and a track section table coupled to the storage device and the extent table.

Still another embodiment of the invention includes a method of searching an extent based data buffer which comprises searching a host pointer in an extent record to find an LBA chain requested by a host, and searching a storage device pointer in the extent record to find a track section requested by a storage device.

Additional novel features shall be set forth in part in the description that follows, and in part will become apparent to those skilled in the art upon examination of the following specification or may be learned by the practice of the invention. The features and advantages of the invention may be realized and attained by means of the instrumentalities, combinations, and methods particularly pointed out in the appended claims.

DEFINITIONS

Figure 1:
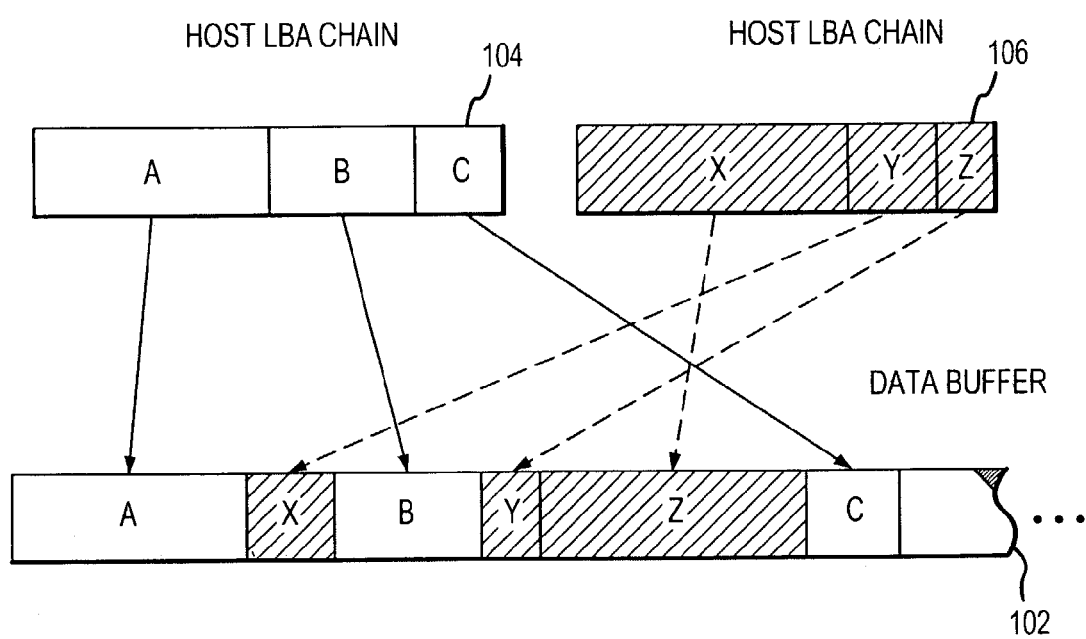
FIG. 1 shows a relationship between host LBAs and extents in the data buffer according to an embodiment of the invention.

A buffer block is defined as 256 consecutive 16-bit words (or 512 consecutive 8-bit bites) in the data buffer.

An extent is defined as a set of one or more sequential buffer blocks containing data that is sequential in the logical block address (LBA) space. Extents represent blocks received by host writes and disk reads without differentiation.

An extent table is defined as one or more extents linked together. This table contains information about buffer block organization and how it relates to LBAs contained in each buffer block. It also contains information about the order in which the host and the disk traverse blocks in the buffer.

An LBA chain is defined as one or more extents linked together by the Extent Allocation Table. An LBA chain contains data that is sequential in the logical block address (LBA) space. The LBA chain size is the total size of its component extents.

The LBA chain table is defined as one or more LBA chains linked together by the time order in which the LBA chain was created in the buffer. LBA chains may be created by a disk read or by a host write. The LBA chain table is used by the host on read commands to determine cache hit and miss conditions.

A track section is defined as one or more contiguous sectors on a single disk track. This means a starting sector and a number of sectors. A track section is always made up of one or more extents. A track section can never be smaller than an extent of which it is made.

The track section table is defined as one or more track sections linked together to describe the disk transfer of sectors on a singe disk track. The track section table defines a track to the disk sequencer to be able to transfer track sections on the track without stopping.

DETAILED DESCRIPTION OF THE PREFERRED EMBODIMENTS

The present invention includes a system and method of using a data buffer to transfer data between a host and a storage device in response to read and write commands. Space in the buffer memory is efficiently allocated by placing sequential LBA data in sequential buffer blocks. However, as more commands are processed, the buffer memory gets increasingly fragmented, making it difficult to allocate sequential buffer space for new read and write requests while preserving previously cached data. In the present invention, sequential LBAs of host data and storage data may be stored non-sequentially in the data buffer. The non-sequential data in the buffer memory is linked together for efficient searching and transfer by the host and the storage device.

Embodiments of the invention also include separate tables used by the host and the storage medium for cataloging and searching the location of data in the buffer. Data may be organized differently in a host than in a storage device and buffer performance may be diminished when a single table is used by both to track data in the buffer. For example, the host may be a computer with DRAM memory organized into sequential LBAs while the storage device may be a hard disk drive with disk storage organized into 512 byte sectors that form tracks on the disk. In this case, the order in which blocks of data are transferred the fastest between the host DRAM memory and the buffer can differ from the order for the fastest transfers between the buffer and hard disk. By having two separate tables, the host and the storage medium may search and transfer buffer data in a sequence that is optimized for the way data is organized in these components. Before describing embodiments of the system and method of the present invention in more detail, some mechanisms of data transfers according to the present invention will be examined.

Example of Buffered Data Transfer

In cache buffered data transfers categories of information are tracked for each block of data in a data cache and these categories include: (1) The block location on the disk, which identifies the data in a block that belongs to a specific LBA on the disk, (2) the block location in the buffer, which identifies the data in a block that is transferred to or from the disk via a specific location in the buffer, and (3) the block time coherency, which identifies the relative time at which a block was received with respect to another block pertaining to the same LBA and controls the block's validity. Generally, the newest/youngest block containing a particular LBAs data is valid.

These categories of information are tied together by a method of cache bookkeeping. One goal for bookkeeping of the cache information is to minimize the hardware needed to describe the categories of information and tie them together. For example, host and disk commands can vary in both the starting LBA and number of blocks, while the data buffer is a fixed number of blocks. These commands may be handled by assigning the exact number of buffer blocks that is required for each command. As commands come in, the buffer blocks may be allocated and de-allocated to the commands. In this way, the buffer block resources are used efficiently with minimal wasting of space.

Referring now to FIG. 1, a relationship between host LBAs and extents in the data buffer according to an embodiment of the invention is shown. FIG. 1 shows interrelationships of host LBAs, buffer extents, and buffer blocks from the host's perspective. The host provides two LBA chains 104 and 106 that are organized into variable sized extents 102 in the data buffer. In this example, LBA chains 104 and 106 are divided into three extents each, labeled A, B, C and X, Y, Z, respectively. The extents 102 may be linked anywhere in buffer, in any order, to form a host LBA chain.

Figure 2:
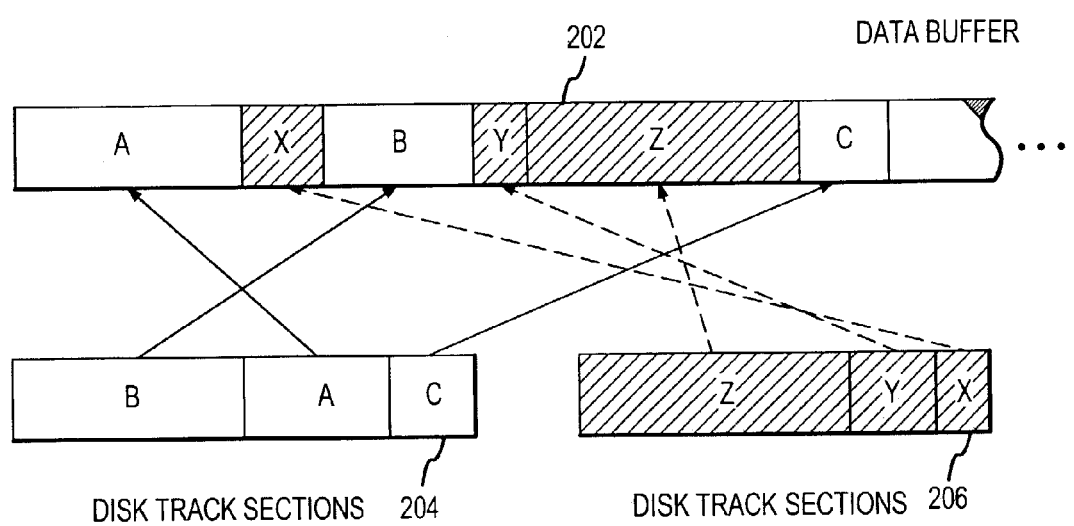
FIG. 2 shows a relationship between the storage device track sections and the extents shown in FIG. 1.

Referring now to FIG. 2, a relationship is shown between the storage device track sections and the extents shown in FIG. 1. This figure shows the interrelationships of disk track sections, buffer extents, and buffer blocks from the storage device's point of view. In this example, disk operations are broken down by the disk into tracks 204 and 206, and further into track sections A, B, C and X, Y, Z, respectively. The track sections from tracks 204 and 206 map to extents 202 in the buffer. In turn, the extents 202 map back to the host LBA chains 104 and 106 and thus the host transfers.

On write operations, the order in which the write data was written by the host to the buffer may be different than the order in which the data is written from the buffer to the disk. This reordering may be due to disk positional optimization algorithms, or write merging, or write cancellation. On read operations, the disk may append prefetched data, or post-fetched data (e.g., read lookahead) to the original host request. A disk track section may be one or more extents in the buffer, and cannot be less than one extent. When a track section is less than one extent, the disk may request that the extent either be split, or trimmed to match the track section. As LBA chains filter down from the host to the disk, the number of extents and their sizes may change to match the disk track sections mapped to the LBA chains.

It is desirable to combine the host and storage device in a way that both may be automated as much as possible. In looking at the different cases of host transfers and storage transfers, and how they are related in the buffer, one can see that the buffer extent lists shown can be the same, share common extents, or be completely different. However, both lists are describing how a given client (host or storage device) will navigate the buffer. The present invention includes a method and system where the lists shown in FIGS. 1 and 2 may be combined into one list of buffer extents in which the information pointing to the next extent for each client would be contained within the extent. This creates a real-time relationship between the LBA chains and the track sections.

Figure 3:
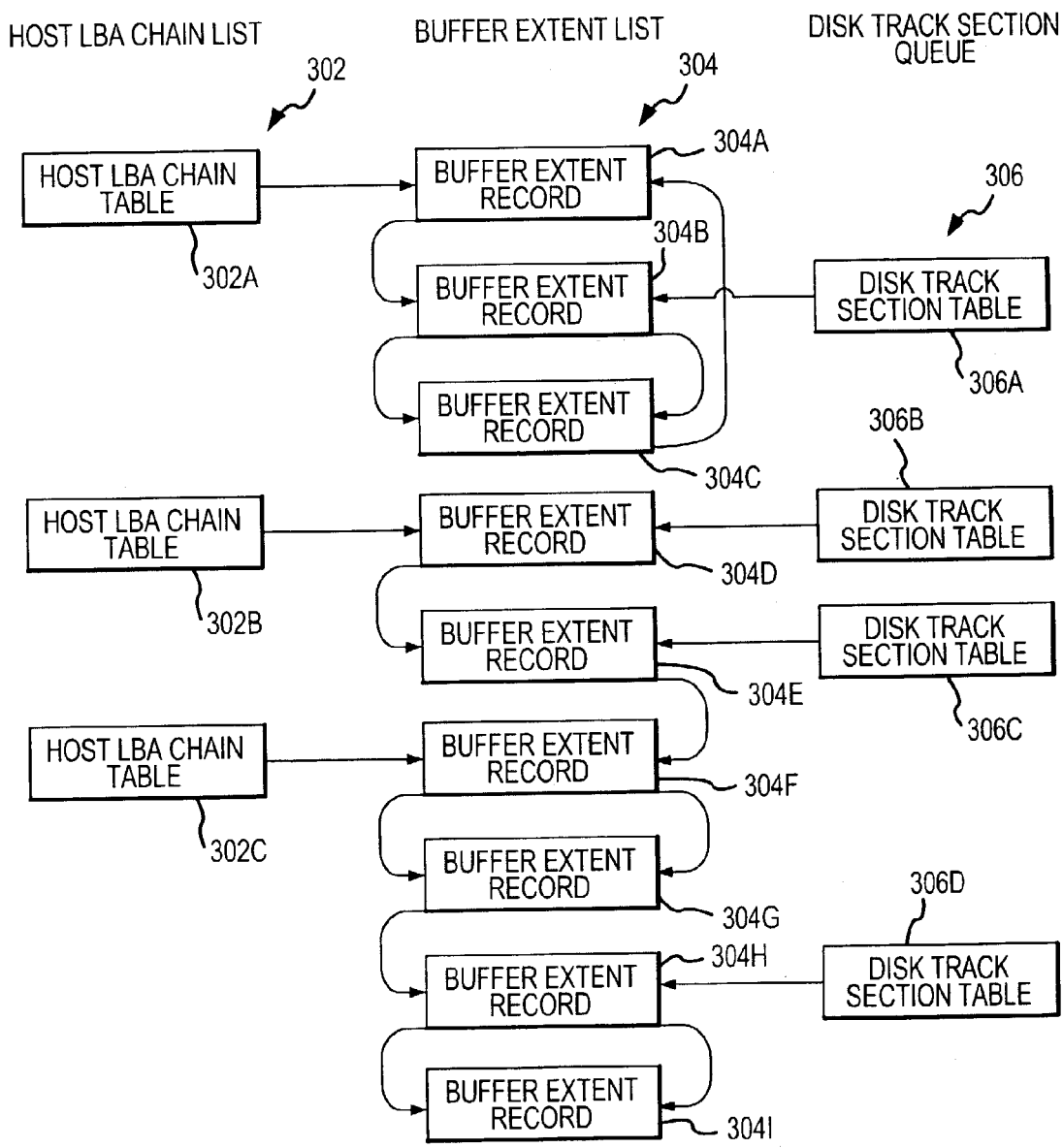
FIG. 3 shows a host and storage device independently traverses a set of extents according to an embodiment of the invention.

FIG. 3 illustrates this by showing how a host and storage device may independently traverse a set of extents 304 according to an embodiment of the present invention. The host side 302 shows an LBA chain may comprise any number of extents 304. Meanwhile, on the disk side 306, the extents 304 making up an LBA chain may be traversed in a different order within the LBA chain, or across LBA chains. This is due to the physical boundaries of track sections. There is one list of buffer extents 304 in which the information pointing to the next extent for the host and the storage device is contained in each extent. This creates a real time relationship between the LBA chains of the host and the track sections of the storage device.

FIG. 3 shows three LBA chain tables 302A, 302B and 302C traversing buffer extents divided among the list of extents 304. The first LBA chain table 302A traverses three extents 304A, B and C in sequential order. Meanwhile, the first disk track section 306A traverses the set of extents 304 in a different order that starts with extent 304B, then goes to extent 304C, and finally jumps to extent 304A. FIG. 3 also shows that host LBAs and disk tract sections can be split into different numbers of extents: Host LBA chain table 302B traverses extent 304D and then extent 304E, while disk track section 306B only maps to extent 304D. Furthermore, FIG. 3 shows how host LBA chain table 302C maps to extents 304F, 304G, 304H and finally 304I, which are also extents included in disk track section 306C and 306D.

The present invention includes a system and method of using a data buffer to transfer data between a host and a storage device in response to read and write commands. Space in the buffer memory is efficiently allocated by placing sequential LBA data in sequential buffer blocks. However, as more commands are processed, the buffer memory gets increasingly fragmented, making it difficult to allocate sequential buffer space for new read and write requests while preserving previously cached data. In the present invention, sequential LBAs of host data, and storage data may be stored non-sequentially in the data buffer. The non-sequential data in the buffer memory is linked together for efficient searching and transfer by the host and the storage device.

Embodiments of the invention also include separate tables used by the host and the storage medium for cataloging and searching the location of data in the buffer. Data may be organized differently in a host than in a storage device and buffer performance may be diminished when a single table is used by both to track data in the buffer. For example, the host may be a computer with DRAM memory organized into sequential LBAs while the storage device may be a hard disk drive with disk storage organized into 512 byte sectors that form tracks on the disk. In this case, the order in which blocks of data are transferred the fastest between the host DRAM memory and the buffer can often from the order for the fastest transfers between the buffer and hard disk. By having two separate tables, the host and the storage medium may search and transfer buffer data in a sequence that is optimized for the way data is organized in these components.

Example of Extented Cache Operation

Interface Between the Host, the Cache, and the Disk

The Interface receives commands from the host and sends requests to the cache for buffer resources. The cache may create new LBA chain table entries and allocate buffer extents for the chain. The cache then sends a request to the disk. For a read, the cache indicates what kind of speculative data to capture along with the request (this can include pre-read, post-read, both or no data). The disk responds back to the cache with information about the starting sector, and how many sectors it will read. The cache may then modify the LBA chain entry and send status back to the interface.

Depending on implementation, the cache or host may start the cache search engine, which will start the host transfer when data is available. For a write, the cache may send a write request to the disk.

Read Command Processing

The interface receives a read command from the host, starting the cache search engine. The cache search engine searches the LBA chain Table for hits. The cache search engine may detect head hits and tail hits across one or more LBA chains. The cache search engine initiates data transfers to the host for any cache hits. Each LBA chain entry has a hit counter. This counter is initialized to zero when an LBA chain is allocated and is incremented for each hit detected in that entry. When the hit counter reaches its maximum count, it is not incremented any further.

If the cache search engine detects a cache miss (e.g., head, tail or full), it informs the firmware of the starting miss LBA and the length of the miss. The interface firmware requests a new LBA chain for the missing data from the cache firmware. This request includes a starting LBA and a length. Also included in the request may be information about speculative data such as pre-read, post-read or read the request only. This may be based on the type of cache miss detected. Total misses may cause requests for pre and post read, head hits cause requests for post-read and tail hits cause requests for pre-read.

The cache firmware creates a new LBA chain entry from the first unused entry. If free entries exist, the cache block finds the oldest LBA chain entry that the disk has completed (e.g., data written to disk or read from disk). Extents associated with this chain are released to the free pool. If the oldest LBA chain entry is a read, the firmware may look at its associated hit counter to decide whether to free it.

The cache firmware allocates buffer space for this LBA chain by allocating free extent(s). The amount of buffer space allocated depends on the Interface request (e.g., pre-request or post-request). If there is not enough free buffer space available or if there are no free extents available, the cache firmware can wait for the disk to complete a request/requests, free up extents associated with the completed request(s), and allocate and link the newly freed buffer space to the new LBA chain. This process can be repeated until enough resources have been freed up to fulfill the new request.

When the requisite resources are available, cache firmware may make a request to the disk firmware to read the requested data. This includes a starting LBA, a length and a starting extent number. The disk firmware creates a new Track queue entry that includes the data from the cache request. The disk firmware then translates the LBA into physical track, head and sector and calculates the landing sector. This information may be fed back to the cache. The cache adjusts the starting LBA and length of the LBA chain based on the first sector that can be read in before the request (pre-read) and sets the Host Extent pointer to the extent/offset of the first host requested sector. The host transfer may then be started, which may be controlled by the room logic. The disk firmware then creates entries in its Track Section Queue, initiates a seek to the desired track, sets the Disk Extent pointer, and starts the disk sequencer.

Write Command Processing

When the interface receives a write command from the host, the interface firmware may request a new LBA chain for the write data from the cache firmware. This request includes a starting LBA and a length.

The cache firmware may create a new LBA chain entry from the first unused entry. If there are no unused entries, the cache firmware may then find the oldest LBA chain entry that the disk has completed (data that has been written to disk or read from disk). Extents associated with this chain are released to the free pool. If the oldest LBA chain entry is a read, the firmware may look at its associated hit counter to decide whether it should be freed.

The cache firmware may allocate buffer space for this LBA chain by allocating free extent(s). If there is not enough free buffer space available or if there are no free extents available, the cache firmware may wait for the disk to complete a request/requests, free up extents associated with the completed request(s), and allocate and link the newly freed buffer space to the new LBA chain. This process may be repeated until enough resources have been freed up to fulfill the new request. At this point the host transfer can be started, which may be controlled by the room logic.

If there is a time constraint from the host command until a transfer should be started, the cache firmware should ensure that enough buffer resources are available to transfer the first sector/block.

The cache firmware may then make a request to the disk firmware to write the requested data. The data may include a starting LBA, a length, and a starting extent number. The disk firmware may then create a new Track queue entry that includes the data from the cache request. The disk firmware may then translate the LBA into a physical track, head and sector and calculate the landing sector. The disk firmware may then re-order its Track queue based on the physical location of the new request and services it as it sees fit.

Cache Search Engine Operation

The cache search engine is a hardware state machine that when started, searches valid LBA chain Table entries and detects cache hits of the requested data. The cache search may be invoked by hardware at the receipt of a read command, or by firmware.

The cache search engine always searches from the youngest LBA chain to the oldest. This ensures that any cache hit will be on the most recent data. The cache search engine can detect hits on the head or tail of the requested data. If a head hit is detected, that data is transferred to the host. If the cache search engine detects a cache miss (e.g., head, tail or full), it will indicate the starting miss LBA and the length of the miss. The search engine will then stop and let the firmware start the read for the missing data. The firmware can then start the search again, which will transfer the missing data to the host.

Disk Delayed Release Logic

There are two disk data pointers, a Real Time Pointer that increments for each sector transferred to/from the disk and a Release Pointer that increments when the sector(s) are determined as good. On a write, good means good servo status on the burst just read. On a read, good means no ECC error or correction has fixed any errors. Traversing the Track Section Table, then traversing the extents within the Track Section Table, advances both pointers.

Example of Disk Command Queuing with Extented Cache

Disk Block Command Overview

The disk block receives commands for sets of LBAs from the Cache Manager block. These commands tell the disk to transfer some set of sequential LBAs to or from the buffer. It is the Disk block's responsibility to determine what physical sectors on the disk need to be transferred to satisfy the given LBA request. Depending on the disk layout, and the number and location of defective physical sectors, the commands given to the Disk block may be processed into one or many track sections on one or many tracks. Once a command is processed into its different tracks and track sections, the Disk block works on an individual track. Once it finishes track sections for a given track, it initiates a seek to the next track and begins to transfer requested track sections on that track.

Disk Block Performance Issues

Since the Disk block works on one track at a time before seeking another track, there are at least four factors that influence disk performance: (1) Data transfer rate—How fast can the disk transfer data off the disk and into the buffer; (2) Seek time—The time it takes to seek from one track to some other track; (3) Rotational latency—The time the disk waits after arriving on a given track for the requested data to pass under the head, and; (4) Command processing overhead—The time it takes for the disk to recognize and process enough of a command to start transferring data associated with that command. The disk data rate is a function of the read channel data rate, spin speed and controller logic speed.

The seek time varies with the distance of the seek operation: The farther away the target track is from the current track, the longer the seek time. Since the seek time is often the largest portion of the time taken to execute a given command, it is advantageous to be able to queue up track operations and execute them in the order that minimizes their seek time. In other words, the next track is chosen to be the track that has the smallest seek time from the current track.

Another factor for some track sections' access time is rotational latency. Rotational latency is the difference between the first sector that can be transferred on a given track after a seek, and the actual requested data. If the disk queues up track section operations, it is useful to be able to choose the track section that is closest to the anticipated arrival location on a given track.

Another factor for disk performance is the command processing time. This time can be rather significant since the disk must do many calculations to translate a LBA address into a physical disk address. In order to minimize the effect of this time the disk firmware will try to do these calculations while a seek is taking place. This has the effect of hiding the time it takes to make these calculations from the overall command processing times. With command queuing, the disk executes these calculations while other commands are transferring and/or while the disk is seeking other tracks.

Disk Block Performance Goals

Since the time that the disk block takes to fully execute a given host command makes up most of the time that the host has to wait for a given command, the disk block's performance should be optimized. One goal is to maximize the amount of time that the disk is actively transferring data to and from the buffer. This goal is related to other sub-goals, including:

One sub-goal is to process as many commands as possible into Tracks and Track sections. This gives the disk as much visibility as possible into the pending host requests so that the next track to work on is selected based on efficiency. This also allows the disk to maximize the amount of data that can be transferred on each track, and allows the disk to be processing a new command while a previous one finishes.

Another sub-goal is to order the list of tracks based on shortest arrival time to the requested data on that track. The next track to be selected should be based on how quickly it can start transferring data to and from the disk.

Disk Command Types

The two types of data transfer commands that the disk receives, are read and write commands. These two types of commands can be reorganized into two different disk command types:

The first command type includes commands in which the whole command must be completed from start to finish before starting other commands (e.g., read commands and write commands with write caching off). This type of command requires the disk to keep track of the progress of the command. When an error is encountered, the status is given for the command (e.g., type of error, number of blocks done). If an error occurs, sectors beyond the error do not have to be transferred. This type of command is also referred to as "disk non-queued" command.

The second command type includes commands in which the command can be processed and merged in with other existing commands and it can be processed in any order (e.g., write commands with write caching on). This type of command may have the disk keep track of blocks that are in error, but not which commands they came from. When an error is encountered, status is given for the block in error (e.g., type of error, block number of error). The disk attempts to transfer the sectors regardless of errors contained within the command limits. This type of command is referred to as a "disk queued" command.

Queued commands can be processed into tracks and track sections and then ordered in a fashion that meets the performance goals discussed above. Non-queued commands, however, take up the attention of the disk block until they are completed. Thus, the goals described above are applied at the single command level for non-queued commands. This means that it might be better to transfer the blocks in a different order than the LBA order given by the command. In order to do this and measure the progress of the command, the disk block should keep track of the track sections in the order that they appear in the command.

Disk Block Command Oueuing Structures

The first structure is the Disk Command Queue entry, which may be represented as follows:

| Disk Command Queue |
| --- |
| (Firmware) |
| Disk Read Or Write Command Queue Entry #1 - (8 bytes) |
| LBAChainPointer (Parameters): WORD<br>CommandOptions: WORD<br>CommandProgressQueueHeadPointer: WORD<br>NextCommandQueueEntryPointer: WORD |

The Disk Command Queue holds entries that represent requests for disk transfers. The Disk firmware uses these entries to keep track of command information. If the command is a non-queued type then the command entry will exist for the life of the Disk command. If the Disk command is a queued command, the Disk firmware may free this structure, to handle a new command, after the command has been processed into track and track sections. When servicing queued commands, the Disk firmware posts errors with a block number designation.

The Disk Command Queue entry attributes may be described as follows:

LBAChainPointer—The disk has passed a pointer to a structure that either is an LBAChainEntry or has that format. The LBAchain entries have the command parameters that are needed for the disk to start a transfer, (e.g., opcode, LBA start and end, starting extent)

CommandOptions—This contains the option flags associated with the command (e.g., AutoReAllocationEnabled, RetryOptions)

CommandProgressQueueHeadPointer—In cases where the status and progress of a given command are tracked, this pointer points to the header entry for the commands progress queue. If command based status is not used this pointer may be set to NULL.

NextCommandQueueEntryPointer—If the disk is busy processing commands and new ones arrive, they are put into a linked list in the order that they were received. This pointer points to the next command to process. If there is one command to process, this pointer may be set to NULL.

For non-queued commands, the requirement to keep track of the commands progress may be filled by the Command Progress Queue, which may be represented as follows:

| Command Progress Queue |
| --- |
| (Firmware) |
| Command Progress Queue Header - (10 bytes) |
| FirstCommandProgressEntryPointer: WORD<br>LastCommandProgressEntryPointer: WORD<br>CommandErrorCode: BYTE<br>AdditionalErrorCode: BYTE<br>NumberOfSectorsCompleted: WORD<br>CommandEntryPointer: WORD |

The Command Progress Queue may be used when the Disk firmware tracks the status and progress of Disk commands on an individual basis. The header for the Command Progress Queue keeps track of the error codes for a command as well as the number of blocks completed. The Command Progress Queue attributes may be described as follows:

FirstCommandProgressEntryPointer—This points to the first entry in the progress queue. When the first entry in the queue is done, it updates the header values.

LastCommandProgressEntryPointer—This points to the last entry in the progress queue. This pointer is used to append entries onto the queue during the command processing.

CommandErrorCode—This holds the disk generated error code.

AdditionalErrorCode—This holds additional error info that might not have been generated by the disk subsystem.

NumberOfSectorsCompleted—This is the number of sectors completed in order from the first sector of the command.

CommandEntryPointer—This points back to the command entry with which this progress queue header is associated. This provides a way to update the command status without starting from the command.

There may be a Command Progress Queue entry for every track section created for the command, which may be represented as follows:

| Command Progress Queue Entry |
| --- |
| (Firmware) |
| Command Progress Queue Entry - (8 bytes) |
| PreviousCommandProgressEntry: WORD<br>NextCommandProgressEntry: WORD<br>NumberOfSectorsForThisEntry: WORD<br>AdditionalSectorsFromOtherEntries: WORD |

When a command is processed, progress entries are queued for each track section made in the order that they fall in the command (e.g., low LBA to high LBA). When a track section is completed, the corresponding Progress Queue entry may be removed and the entry pointed to by the previous pointer is updated. If the previous pointer is NULL then the progress queue header is updated. The Command Progress Queue Entry attributes may be described as follows:

PreviousCommandProgressEntryPointer—This points to the previous entry in the progress queue. When this entry is deleted, the sum of NumberOfSectorsForThisEntry and AdditionalSectorsFromOtherEntries will be added to the AdditionalSectorsFromOtherEntries field of the previous entry.

NextCommandProgressEntryPointer—This points to the last entry in the progress queue. This pointer is used to append entries onto the queue during the command processing.

NumberOfSectorsForThisEntry—This is the number of sectors that this entry is holding.

AdditionalSectorsFromOtherEntries—This is the number of sectors that can be passed on when this entry is deleted. These sectors come from entries for sectors later in the command.

For both queued and non-queued commands, the command queue entries may be processed into a list of tracks to do and a list of track sections to do on a given track. The Disk Track Queue is divided into a hardware section and a firmware section. The hardware section is understood by the hardware so that it can choose, for the firmware, the next track with the shortest access time. The firmware would then be responsible for setting and maintaining the access time field based on the current track position. The Hardware Track Queue may be represented as:

| Hardware Track Queue Entry |
|---|
| Hardware Track Queue Entry #1 - (12 bytes) |
| FLAGS: 4 BITS |
| NextEntryPointer: BYTE |
| PreviousEntryPointer: BYTE |
| Cylinder: 24 bits |
| Head: 4 bits |
| AccessTime: DOUBLE WORD |
| FirmwareTrackEntryPointer: WORD |

The Hardware Track Queue entry attributes may be described as follows:

Flags—These flags are used to aid in communication between the hardware and firmware on an entry basis.

NextEntryPointer and PreviousEntryPointer—These point to the neighboring track queue entries and aid in traversing the list, deleting and inserting entries.

Cylinder and Head—These form the track number on the disk and give the physical location of the track on the media.

AccessTime—This is a value that indicates the amount of time needed to access this track from the current track. This value may not be the actual time but may be smaller for shorter access times and larger for longer access times.

FirmwareTrackEntryPointer—This points to the firmware part of the track queue entry.

The firmware section is used by the firmware to store additional information about a given track. The firmware information describes information to transfer data on the track. The Firmware Track Queue Entry may be represented by:

| Firmware Track Queue Entry |
|---|
| Firmware Track Queue Entry #1 - (18.5 bytes) |
| Flags: 4 BITS TrackSkew: WORD ZoneTablePointer: WORD |
| BurstPreceedingFirstSector: WORD |
| BurstFollowingtastSector: WORD |
| TrackSectionQueueEntryCount: WORD |

| -continued |
|---|
| Firmware Track Queue Entry |
| Firmware Track Queue Entry #1 - (18.5 bytes) |
| TrackSectionQueueHeadPointer: WORD |
| TrackSectionQueueTailPointer: WORD |

The Firmware Track Queue entry attributes may be described as follows:

Flags—function is configurable by firmware.

TrackSkew—this holds the track skew in sectors for this track.

ZoneTablePointer—This points to the zone table that holds zone information about this track.

BurstPrecedingFirstSector and BurstFollowingLastSector—These describe the servo burst boundaries of the transfer on this track. These numbers are used in calculating the access time for the track.

TrackSectionQueueEntryCount—This holds the number of track section entries that make up the transfer on this track.

TrackSectionQueue Head and Tail Pointers—These pointers mark the beginning and end of the track section queue for this track.

Each track has a list of track sections to be completed on the track. The track section entry provides the link to the buffer for the disk. The disk track section queue is divided into two parts: a hardware part and a firmware part. The hardware part can be used by the hardware to feed other disk hardware responsible for actually transferring sectors off the disk. It contains information that can be used by the disk hardware to transfer a set of contiguous sectors on a track. The Hardware Track Section Queue may be represented by:

| Hardware Track Section Queue Entry |
|---|
| Hardware Track Section Queue Entry - (8.75 bytes) |
| StartingExtentNumber: 10 bits |
| StartingOffsetInExtent: 14 BITS |
| Flags: 6 bits |
| StartingSectorOnTrack: 12 BITS |
| EndingSectorOnTrack: 12 BITS |
| HardwareNextEntryPointer: BYTE |
| FirmwareTrackSectionEntryPointer: BYTE |

The Hardware Track Section Queue entry attributes may be described as follows:

StartingExentNumber—This tells the disk hardware what extent number the sectors in this section start at. When the disk starts this transfer the raw disk pointer will be set to this value.

StartingOffsetInExtent—This tells the disk hardware what offset into the given extent the sectors in this section start at. When the disk starts this transfer the raw disk pointer offset will be set to this value.

Flags—These are a set of control bits that can be used to communicate data between the firmware and hardware. These control bits include a pause bit and a locked bit to aid the firmware in appending and modifying entries in the queue without fear of hardware usage.

StartingSectorOnTrack—This holds the physical sector number of the first sector on the track to transfer for this section.

EndingSectorOnTrack—This holds the physical sector number of the last sector to transfer for this section.

HardwareNextEntryPointer—This points to the next section entry for the hardware to execute.

FirmwareTrackSectionEntryPointer—This points to the firmware track section entry that is associated with this hardware track section entry.

The second part of the disk track section is the firmware part. The firmware part is used as an aid in manipulating and updating the hardware track section entries. It contains information about how to traverse the hardware queue both forward and backward. It may be used when the firmware needs to insert or delete entries in the queue. The Firmware Track Section Queue may be represented by:

| Firmware Track Section Queue Entry |
|---|
| Firmware Track Section Queue Entry - (8 bytes) |
| PreviousHardwareTrackSectionEntryPointer: WORD |
| PreviousEntryInPoolIndex: WORD |
| NextEntryInPoolIndex: WORD |
| CommandProgressQueueEntryPointer: WORD |

The Firmware Track Section Queue entry attributes may be described as follows:

PreviousHardwareTrackSectionEntryPointer—This points to the previous hardware track section entry in the track section queue. This helps the firmware traverse the queue backwards and aids in insertions and deletions.

Previous and Next EntryInPoolIndexes—These are pointers to the next and previous track section entries in an available pool. The pool keeps track of all the available hardware and firmware track section entries. The firmware then draws from this pool to create a track section queue for a track. These pointers allow the firmware to manipulate and update that pool to keep track of free and in use entries.

CommandProgressQueueEntryPointer—This points to the command progress entry that is associated with the track section queue entry. When the track section queue is finished by the hardware, the firmware may use this pointer to update the command progress queue.

Disk Block Command Queuing Structure Interaction

As noted above, a disk can receive commands that are queued and non-queued. For each case, the interaction between structures represented by the entries above may be different.

Figure 4:
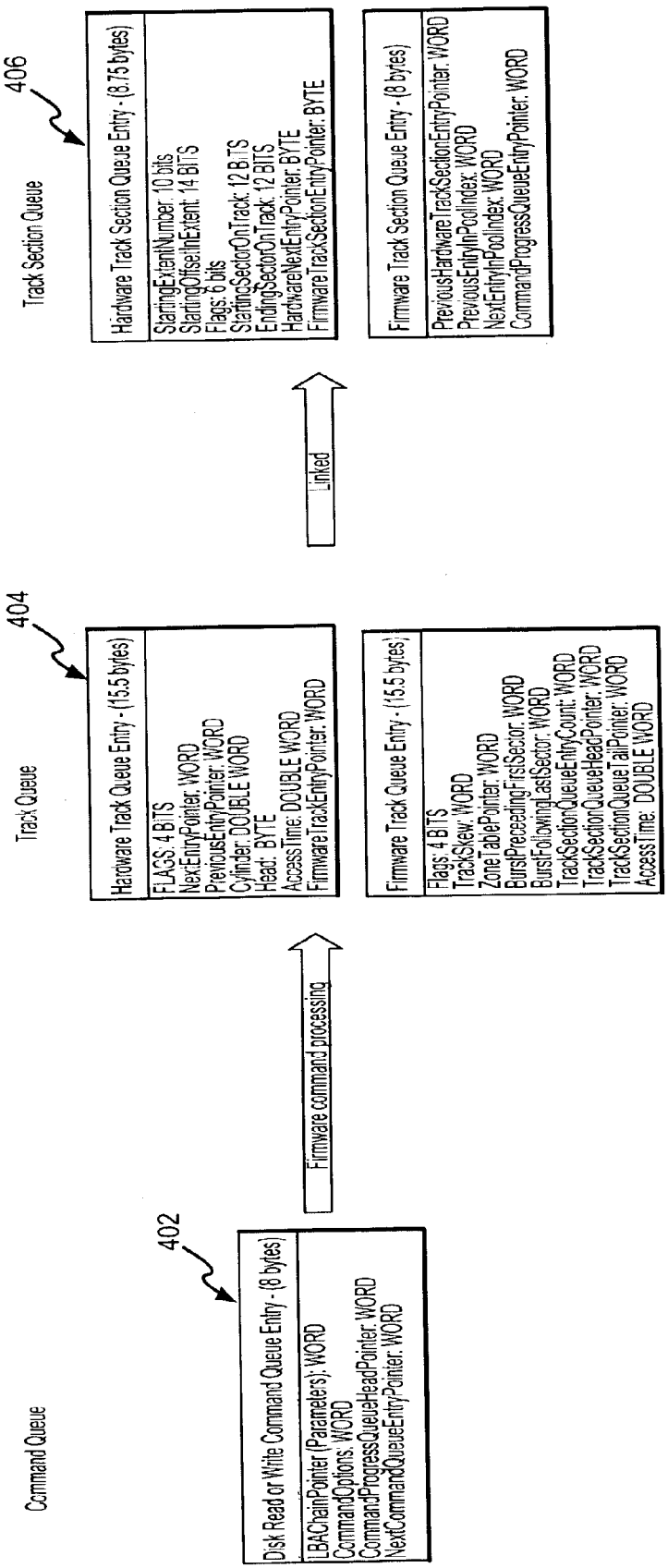
FIG. 4 shows an example of the interaction between queued command data structures according to an embodiment of the invention.

FIG. 4 shows an example of the interaction between some of the above-described structures in the case of a queued command. In this example, the Disk firmware processes a given command into track queue entries 404 and track section queue entries 406. Since, in the queued mode, the Disk does not need to keep track of the transfer progress on an individual command basis, the command entry 402 can be freed after the command has been fully processed into it tracks and track sections. Therefore, in this mode the Disk Command Queue 402 only needs to be two or three entries.

If the command status is not needed, then the command progress queue is also not needed in this mode. Instead, errors for individual blocks or sets of blocks are reported back to the client that sent the command. Other blocks can be assumed transferred without error. In a queuing situation, it is desirable to be able to take in as many commands as possible. This allows the disk firmware to see many tracks for re-ordering and command merging and trimming. Therefore, it is also desirable to have as many track queue entries 404 and track section queue entries 406 available as possible.

Figure 5:
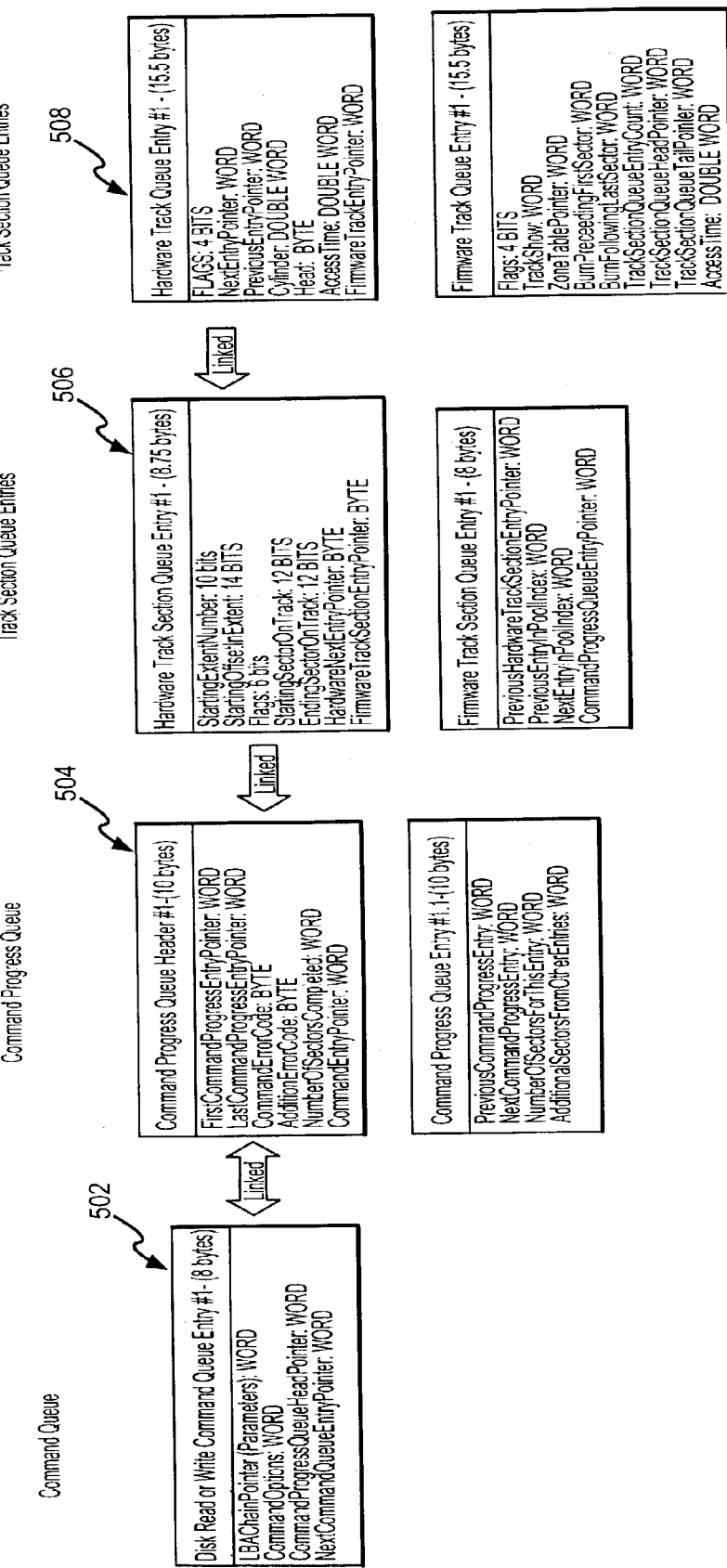
FIG. 5 shows an example of the interaction between non-queued command data structures according to an embodiment of the invention.

FIG. 5 shows an example of the interaction between some of the above-described structures in the case of a non-queued command. In the non-queued case, the disk processes one command at a time from the Command Queue 502 and the command status is tracked for each command. Since the disk processes one command at a time, there is one Command Progress Queue 504 with entries for the track sections from the Track Section Queue 506 for that command. In this mode, extra track sections from an additional Track Section Queue 508 may be available so that the sections can be queued up long before they are needed. Likewise, it may desirable to have extra Command Progress Queue 504 entries.

When in non-queued mode, the Track Section Queues 506, 508 may be smaller. Since the disk transfers on one track at a time, and there is a seek in between transfers, there only needs to be enough track queue entries to keep the disk firmware ahead of the transfer.

System Overview

Figure 6:
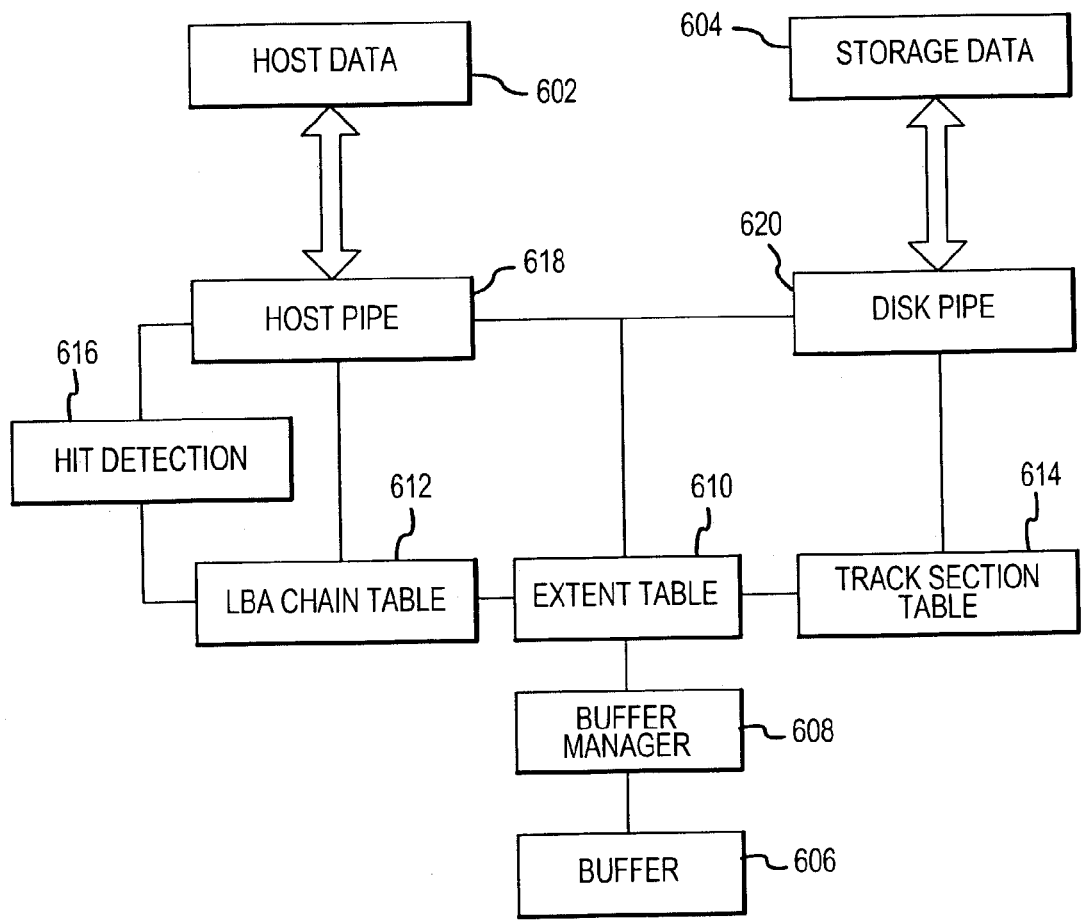
FIG. 6 shows an embodiment of the system of the present invention.

Referring now to FIG. 6, an embodiment of the system of the present invention is shown. In this embodiment, host data from a host 602 and storage data from a storage device 604 (e.g., a hard disk drive) are transferred between each other through data buffer 606. In response to read and write commands, data from host 602 is transferred to and from the buffer 606 via a host pipe 618, and data from storage device 604 is transferred to and from the buffer 606 via a storage pipe 620.

Data transfers between the host 602 and the buffer 606 are recorded in LBA Chain Table 612 while data transfers between storage device 604 and the buffer 606 are recorded in Track Section Table 614. As noted above, the host 602 can track data in buffer 606 through the LBA Chain Table 612 and the storage device 604 can buffer data through the Track Section Table 614.

The memory in the buffer 606 may be organized into one or more extents. Each extent is of variable size, containing one or more sequential buffer block that includes data sequential in the LBA space. When no extent is large enough to satisfy a new request, multiple extents may be allocated for the request with the extents linked together in sequential LBA order. The extent table 610 describes each extent and how they are linked in buffer 606.

The buffer manager 608 uses the extent table 610 to control host pipe 618 and disk pipe 620, and allows pipes 618 and 620 to transfer sequential host data 602 and storage data 604 to and from non-sequential locations in buffer 606. The LBA chain table 612 relates LBAs in host data 602 to buffer extents, and the track section table 614 relates disk tracks in the storage data 604 to the extents. The buffer manager 608 may use LBA chain table 612 for cache hit detection 616.

Components of the system shown in FIG. 6 will now be described in more detail.

Extent Table

The extent table 610 shown in FIG. 6 (also referred to a an extent allocation table) is an array of extent records that describes the user data buffer space. It allows buffer block reordering and dynamic buffer block allocation.

Each extent record describes a single extent, and each buffer block is contained in a single extent record. Every buffer block is mapped to an extent. Each extent record describes the length and location of an extent of blocks in the DRAM buffer. An extent record also describes how that buffer extent is linked to another buffer extent for both the host and the disk transfers, making the extent allocation table independently traversable for each type of transfer.

Extent records have links for traversing the extent allocation table as well as flags. The flags describe host activity, disk activity, and data status within an extent. Table 1 below describes an example extent record that supports up to 1024 extent records, and a DRAM buffer of 64 Mbits (16384 blocks).

TABLE 1

Example Extent Record
Extent Record

| Extent Record Field | Number of Bits |
|---|---|
| StartingBufferBlock | 14 bits |
| NextBufferExtent | 10 bits |
| NextHostExtent | 10 bits |
| NextDiskExtent | 10 bits |
| Flags: | |
| DiskActive | 1 bit |
| HostActive | 1 bit |
| DataValid | 1 bit |
| DataDirty | 1 bit |
| Reserved | 1 bit |
| Reserved | 1 bit |
| Reserved | 1 bit |
| Reserved | 1 bit |
| TOTAL | 52 bits (6.5 bytes) |

The Extent Record fields may be described as follows:

StartingBufferBlock: This is the number of the first buffer block of the extent. The extent size can be calculated by subtracting the StarlingBufferBlock of the current extent record from the StartingBufferBlock of the NextBufferExtent.

NextBufferExtent: This is the number of the extent that is physically contiguous in the buffer to the current extent record. This field shows how to traverse the buffer blocks, in order, through the buffer.

NextHostExtent: This is the number of the extent record which points to the buffer blocks containing the next sequential LBA information for host transfer to/from the buffer. This field shows how to traverse the buffer blocks through a host LBA chain transfer. The host pipe may use this field to determine the buffer block address when traversing from one extent to another.

NextDiskExtent: This is the number of the extent record which points to the buffer blocks containing the next disk track information for disk transfer to/from the buffer. This field shows how to traverse the buffer blocks through a disk track transfer. The disk pipe may use this field to determine the buffer block address when traversing from one extent to another.

The Flags may be described as follows:

DiskActive: This is a bit which indicates that the disk pipe has data pending release to or from any buffer block in this extent. This bit may be set by hardware or firmware. The disk pipe hardware sets this bit when disk data transfer begins in the extent, and is cleared when the disk pipe leaves the extent and has released all of the blocks in the extent. Disk data transfer is considered started when the buffer block address for the first block in the extent is loaded into both the disk real-time data pointer and the disk release data pointer by the disk pipe hardware. The disk data transfer is considered ended when the disk release data pointer is loaded with a buffer block address not in the current extent. The DiskActive bit should remain set in the extent as long as either the disk release data pointer or the disk real-time data pointer are in that extent. The firmware may set or clear this bit as needed for aborts or errors.

The disk may have DiskActive set in more than one extent at a time due to the delayed release logic that allows the disk to be transferring blocks ahead of the blocks being released. In many cases, the disk may be actively transferring blocks in one extent and then releasing previously transferred blocks in a prior extent. Therefore, DiskActive in an extent may get set when the disk release data pointer is set to point to that extent.

HostActive: This is a bit which indicates that the host pipe is currently transferring data to or from any buffer block in this extent. This bit may be set by hardware or firmware. The host pipe hardware sets this bit when host data transfer begins in the extent, and is cleared when host data transfer leaves the extent. Host data transfer may be considered "started" when the buffer block address for the first block in the extent is loaded into the host data pointer by the host pipe hardware. The host data transfer may be considered "ended" when the host data pointer is loaded with a buffer block address not in the current extent. The firmware may set or clear this bit as needed.

Data Valid: A bit that is set by the hardware to indicate that all blocks of data in the extent are valid. Data may be validated by a host write or by a disk read. DataValid is set by the host pipe upon writing blocks, and by the disk pipe upon reading blocks. Data Valid indicates that the data contained in the blocks of the extent are valid in the DRAM buffer. On disk reads, DataValid may be set after the last byte in the last block in the extent has been read successfully from the disk to the buffer. On host writes, Data Valid may be set after the last byte in the last block in the extent has been successfully written from the host to the buffer. On disk reads, DataValid may be cleared when the disk pipe becomes active for reading in an extent. On host writes, DataValid may be cleared when the host pipe becomes active for writing in an extent.

DataDirty: This bit is set by the hardware on writes to indicate that some or all of the blocks in the extent have not been written to the disk. "Dirty" means that the host-write data is not yet coherent with the corresponding data on the disk. On host writes, DataDirty is set when the host pipe becomes active for writing in an extent. On disk writes, DataDirty is cleared after the disk pipe successfully writes the last byte of the last block in the extent.

LBA Chain Table

The LBA chain table is a time-ordered list of LBA chains in the buffer. Each LBA chain table entry defines a stream of sequential LBAs spread across one or more buffer extents. The extents that make up the chain are linked together by the extent allocation table. A particular LBA may exist in more than one LBA chain and extent. However, since the LBA chain table is linked in time order, the LBA in the most recent chain (closest to the head) is the most valid. Table 2 below describes an example of an LBA chain table entry that supports up to 1024 extent records, and up to 64 LBA chains.

TABLE 2

Example LBA Chain Table Entry
LBA Chain Entry

| LBA Chain Field Name | Number of bits |
|---|---|
| StartingLBA | 32 bits |
| LBAChainLength | 16 bits |
| StartingExtent | 10 bits |
| NextLBAChain | 6 bits |
| PreviousLBAChain | 6 bits |
| HitCounter | 4 bits |
| Flags: | |
| Locked | 1 bit |
| WriteData | 1 bit |
| WriteCacheEnabled | 1 bit |
| ScanActive | 1 bit |
| DiskInUse | 1 bit |
| Reserved | 1 bit |
| TOTAL | 80 bits (10 bytes) |

The LBA Chain Fields may be described as follows:

StartingLBA. This is the LBA of the first block in the LBA chain.

LBA ChainLength: This is the total size in blocks of all the extents assigned to the LBA chain.

StartingExtent: This is the number of the first extent record associated with this LBA chain.

NextLBAChain: This is the number of the next time-ordered LBA chain table entry.

PreviousLBAChain: This is the number of the previous time-ordered LBA chain table entry.

HitCounter: This is a value that is set to zero when an LBA chain is created and incremented every time there is a cache hit on that LBA chain. This may be used by the firmware for LBA chain replacement algorithms.

The Flags may be described as follows:

Locked: This is a bit to indicate that the LBA chain is unavailable to host hardware for scans or transfers.

WriteData: This is a bit that is set to indicate that this LBA chain is for write data. When cleared, the LBA chain is for read data. A subsequent read hit to this write data does not clear this bit. This bit is cleared if the LBA chain was created from a read command, or from disk read ahead or read behind.

WriteCacheEnabled: This is a bit that indicates whether write caching is enabled for this LBA chain. This bit is used with ATA commands that require write data to be immediately flushed to the disk.

ScanActive: This is a bit that indicates that the hardware is scanning this LBA chain for a hit. This bit makes the cache and disk firmware aware of host activity in an LBA chain in the event of needing to modify or re-allocate that LBA chain and its extents.

DiskInUse: This is a bit that indicates if any extent has either DiskActive or DataDirty asserted. If either bit is TRUE in an extent then it means the LBA chain may not be de-allocated. The firmware may check this bit when allocating/de-allocation LBA chain resources.

The Track Section Table

The track section table describes how to transfer a given track of data between the disk formatter and the data buffer. A list of extents to be traversed in the buffer, along with disk track information, tell the formatter how to transfer the extents in the buffer with respect to a physical track on the disk. A disk track may be transferred using one or more extents. Each disk track section is a contiguous number of sectors and corresponds to at least one extent of blocks in the buffer. Table 3 shows an example of a disk track section table entry:

TABLE 3

Example of a Track Section Entry
Track Section Entry

| Field Name | Number Of Bits |
|---|---|
| StartingExtent | 10 bits |
| StartingOffsetInExtent | 14 bits |
| Flags | 6 bits |
| StartingSector | 12 bits |
| EndingSector | 12 bits |
| HardwareNextTrackSection | 8 bits |
| FirmwareTrackSection | 8 bits |
| Total | 70 bits (8.75 bytes) |

The field names may be defined as follows:

StartingExtent: This is the number of the first extent record of the track section. This field is used by the disk formatter to derive the disk data pointer.

StartingOffsetInExtent: This field tells the disk hardware at what offset into the given extent the sector in this section starts. When the disk starts this transfer in this section, the disk data pointer offset field is set to this value.

Flags: This field is a set of control bits that are used to communicate between the firmware and the hardware.

StartingSector: This is the first physical sector number of the track section.

EndingSector: This is the last physical sector number of the track section.

HardwareNextTrackSection: This is the number of the next track section entry for the transfer. In this example, the 8-bit field can support up to 256 track sections.

FirmwareTrackSection: This is the number of the firmware track section entry with which the hardware track section entry is associated. This feature may be used by the firmware.

Disk Pipe

The disk pipe is the disk data transfer hardware that handles transfers between the data buffer and the disk. This hardware may be incorporated into the disk DRAM port. At a particular point in time, this block may be either reading or writing, and one buffer pointer may be required. The components of the disk pipe include the Disk Data Pointer, the Disk Room Logic, and the Disk Delayed Release Logic. Below is list of the disk pipe registers that may be included in a disk pipe register set.

| Disk Pipe Registers | Register Type | Access |
|---|---|---|
| DiskPipeControl | Input | Read/Write |
| DiskPipeStatus | Output | Read only |
| TrackSectionNumber | Input | Read/Write |
| DiskTransferCount | Input | Read/Write |
| DiskBlockRemainingCount | Output | Read/Write |
| DiskRealTimeDataPointer | Output | Read/Write |
| DiskReleaseDataPointer | Output | Read/Write |
| ExtentBlockCount | Output | Read/Write |
| ExtentBlockRemainingCount | Output | Read/Write |
| ExtentBlockDoneCount | Output | Read only |

The DiskPipeControl Register may be described in the following table:

DiskPipeControl

| Bit # | Bit Name | Bit Description |
|---|---|---|
| 0 | StartTransfer | Set to initiate a disk pipe transfer starting at the specified starting track section. |
| 1 | DiskPipeWrite | Set by firmware prior to disk pipe transfer to specify data direction from buffer to disk. |
| 2 | DiskPipeRead | Set by firmware prior to disk pipe transfer to specify data direction from disk to buffer |
| 3 | StopTransfer | Set by firmware to halt the disk pipe transfer |

The DiskPipeStatus register includes a set of flags that may be used with the disk data pointers to control the room logic and interact with the extent allocation table entries.

DiskPipeStatus

| Bit # | Bit Name | Bit Description |
|---|---|---|
| 0 | DiskPipeActive | This is a bit to indicate that the disk pipe is currently transferring data to/from the buffer. |
| 1 | DiskWriteActive | This is a bit that indicates the disk pipe is set up for writing data from buffer to disk. |
| 2 | DiskReadActive | This is a bit that indicates the disk pipe is set up for reading data from disk to buffer. |
| 3 | DiskNoRoom | This is a bit to indicate whether or not the disk may continue data transfer in the current extent. |

The TrackSectionNumber register is an input register to the disk pipe. This register is set by the firmware prior to starting a disk pipe transfer. It is set to the starting track section entry number on which the disk pipe is to operate. Contained within the track section entry may be disk sequencer information about the extent to locate the data in the buffer, and the disk track to locate the data on the disk.

The DiskTransferCount register is an input register set by the firmware before starting the transfer to the total number of disk sectors intended to transfer.

The DiskBlockRemainingCount register is an output register that indicates the number of blocks remaining for the disk pipe to transfer (according to the DiskRealTimeDataPointer). The hardware may update this register after the DiskRealTimeDataPointer completes the transfer of one sector to/from the disk.

The DiskRealTimeDataPointer is the current position of the disk sequencer in terms of the extent number and block offset within that extent. The real-time pointer indicates the block on which the disk is currently working but may not have released. An example of the real-time disk data pointer looks as follows:

DiskRealTimeDataPointer (24 bits)

| ExtentNumber | BlockOffsetIntoExtent |
|---|---|
| 10 bits | 14 bits |

In this example the pointer is a three-byte field that describes the disk's buffer address. The 10 bit extent number allows for as many as 1024 extents. The 14 bit offset allows for a 64 Mbit buffer.

BufferBlockNumber=ExtentNumber→StartingBufferBlock+Block OffsetIntoExtent
BufferByteAddress=BufferBlockNumber*512

When the disk data pointer is not actively being used to transfer data, the ExtentNumber field may be set to NULL. This helps the extent logic distinguish between the disk pipe transferring data in an extent versus sitting in an extent because it was the last one in a chain.

The DiskReleaseDataPointer indicates the block that is next to release by the disk pipe in terms of the extent number and block offset within that extent. The release pointer indicates the next block that is to be read or written successfully by the disk pipe. If the BlockOffsetIntoExtent is set to zero, it means that no blocks have been released in this extent. If the BlockOffsetIntoExtent is set to one, it means that the $0^{th}$ block in the extent has been released. If the BlockOffsetIntoExtent is set to two, it means that the $0^{th}$ block and the $1^{st}$ block in the extent have been released, and so on. An example of the release disk data pointer looks as follows:

DiskReleaseDataPointer (24 bits)

| ExtentNumber | BlockOffsetIntoExtent |
|---|---|
| 10 bits | 14 bits |

In this example, the pointer is a three-byte field that describes the disk's buffer address. The 10 bit extent number allows for as many as 1024 extents. The 14 bit offset allows for a 64 Mbit buffer.

BufferBlockNumber=ExtentNumber→Starting BufferBlock+BlockOffsetIntoExtent
BufferByteAddress=BufferBlockNumber*512

When the disk data pointer is not actively being used to transfer data, the ExtentNumber field may be set to NULL. This helps the extent logic distinguish between the disk pipe transferring data in an extent versus sitting in an extent because it was the last one in a chain.

The ExtentBlockCount register is an output register from the disk pipe and specifies the total number of blocks in the current extent as indicated by the DiskRealTimeDataPointer. This value is computed by the hardware every time DiskRealTimeDataPointer. ExtentNumber is set to a new extent.

ExtentBlockCount=Extent[NextDiskExtent].StartingBufferBlock−Extent[ExtentNumber].StartingBufferBlock The ExtentBlockRemainingCount is an output register from the disk pipe and it specifies the number of blocks remaining to transfer in the current extent as indicated by the DiskRealTimeDataPointer. Upon entering an extent, the hardware loads this register with ExtentBlockCount and then decrements it every time a disk data sector pulse occurs. Since this count field is relevant to the disk real-time pointer, it does not reflect blocks released to the host.

The ExtentBlockDoneCount register is an output register from the disk pipe and it specifies the number of blocks released in the current extent as indicated by the DiskReal- TimeDataPointer. Upon entering an extent, the hardware loads this register with zero and then increments it every time a disk data sector pulse occurs. Since this count field is relevant to the disk real-time pointer it does not reflect blocks released to the host.

Disk Pipe State Machine

State transitions may be caused by disk pipe input registers, signals from other blocks, and disk pipe output register values. The example below lists some disk pipe states and actions taken in each state. The CurrentSectorNumber register may be updated by the disk sequencer.

Initialize
   TrackSectionNumber=#
   DiskTransferCount=#
   HostPipeRead or HostPipeWrite=TRUE
ConnectToTrackSection:
   DiskBlockRemainingCount=DiskTransferCount
   DiskPipeActive=TRUE
   DiskWriteActive or DiskReadActive=TRUE
NextTrackSection:
   TrackSectionNumber=TrackSection.NextTrackSection
FirstExtent:
   DiskRealTimeDataPointer.ExtentNumber=TrackSection.Starting Extent
   DiskRealTimeDataPointer.ExtentOffset=TrackSection.StartingOffsetInExtent
   ExtentBlockCount=NextDiskExtent.StartingBlock–StartingBlock
   ExtentBlockRemainingCount=minimum ((ExtentBlockCount–DiskRealTimeDataPointer.ExtentOffset), DiskBlockRemainingCount)
NextExtent:
   DiskRealTimeDataPointer.ExtentNumber=NextDiskExtent
   DiskRealTimeDataPointer.ExtentOffset=0
   ExtentBlockCount=NextDiskExtent.Starting Block–Starting Block
   ExtentBlockRemainingCount=minimum (ExtentBlockCount, DiskBlockRemainingCount)
BlockNoRoom:
   DiskNoRoom=TRUE
BlockRelease:
   DiskNoRoom=FALSE
NextBlock:
   DiskRealTimeDataPointer.ExtentOffset++
   DiskBlockRemainingCount--
   ExtentBlockRemainingCount--

Figure 7:
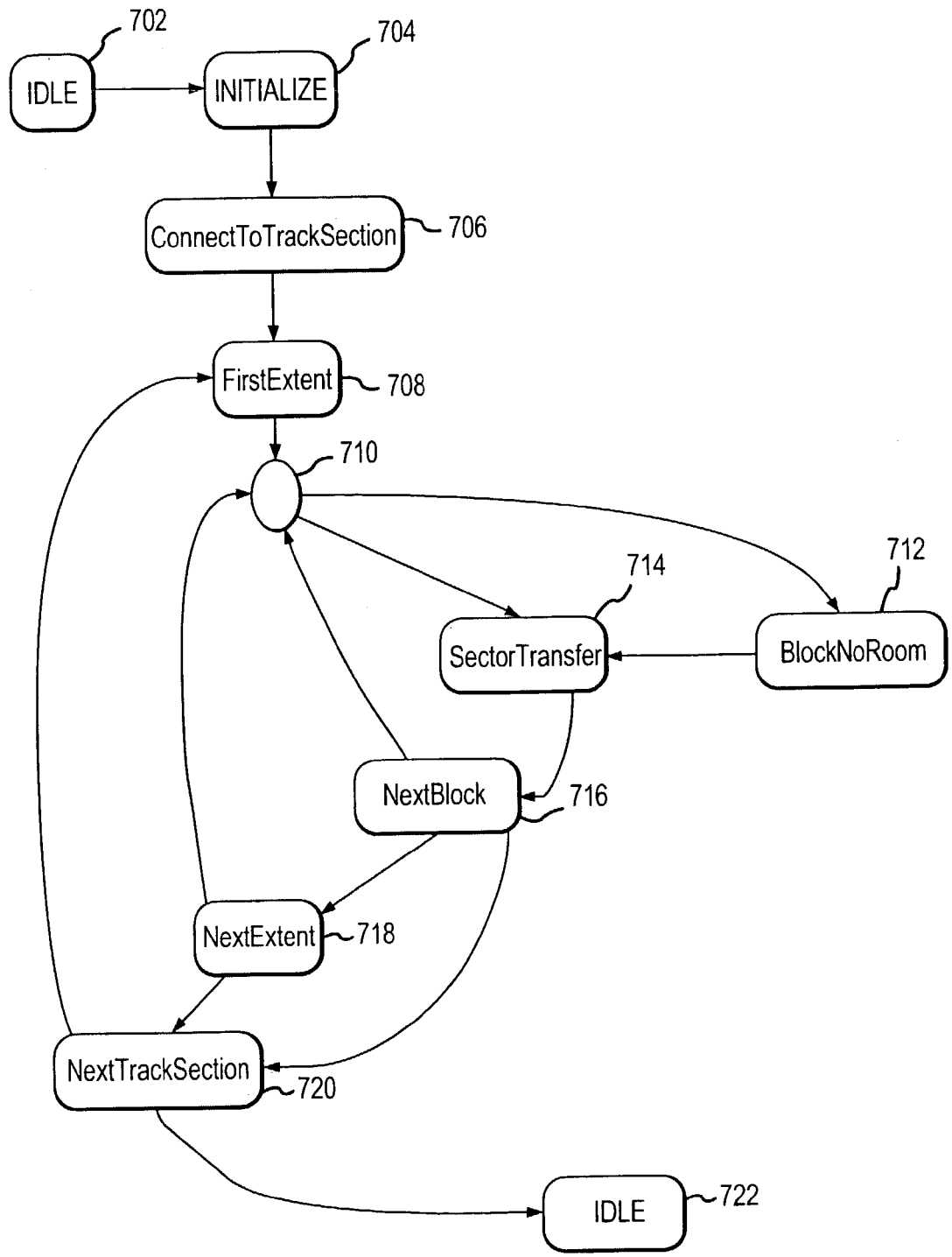
FIG. 7 shows a flowchart of states for a disk pipe state machine according to an embodiment of the invention.

FIG. 7 is a disk pipe state machine flowchart that shows the order of the disk pipe states from the list above. In this flowchart example, the disk pipe state machine is in an idle state 702 until the initialize state 704 is activated and a transfer starts. Upon start of a transfer, the machine enters the ConnectToTrackSection state 706 followed by the FirstExtent state 708. Once the first extent has been identified in the FirstExtent state 708, the machine enters a conditional state 710 that may be under the control of the Disk Room Logic.

The Disk Room Logic uses the track section table (disk command queue), the extent records, and the disk data pointer to enable or disable disk data transfers. The Disk Room Logic may use the DiskRealTimeDataPointer to determine room.

Some scenarios presented to the disk room logic include: (1) DiskNoRoom on a write command where the disk is about to start a write from an extent and that extent has not yet been written with data from the host. In this scenario, the host and disk are active in the same extent, both are writing, and the disk data pointer is greater or equal to the host data pointer (i.e., the disk is about to pass the host in the same extent). (2) DiskNoRoom on read commands is normally not encountered since all read data originates from the disk, and there should be room on disk reads.

One example of a Boolean equation for DiskNoRoom is:

DiskNoRoom=DiskWriteActive & ((HostActive & HostWriteActive & (DiskRealTimeDataPointer.BlockOffset≧HostExtentOffset))| (!HostActive & !DataValid))

Where HostActive and DataValid refer to the bits in the extent pointed to by the DiskRealTimeDataPointer.ExtentNumber.

Referring back to FIG. 7, when the Disk Room Logic determines that the DiskNoRoom condition is true, then the machine goes from the conditional state 710 to the BlockNoRoom state 712. The machine may remain in the BlockNoRoom state 712 until the Disk Room Logic sets the DiskNoRoom condition to false and the machine enters the SectorTransfer state 714. Alternatively, the BlockNoRoom state 712 may be bypassed when the Disk Room Logic finds the DiskNoRoom condition false when the machine first enters the conditional state 710. In this case, the machine passes directly from the conditional state 710 to the SectorTransfer state 714.

Once the machine completes the sector transfer, it passes from the SectorTransfer state 714 to the NextBlock state 716. In the NextBlock state 716 the machine determines whether another extent should be transferred between the disk and data buffer. If so, the machine enters the NextExtent state 718. Then the machine determines whether the next extent is the final extent of the track section, and if so, it enters the NextTrackSection state 720. In the NextTrackSection state 720 the machine determines if there are anymore track sections to transfer and if not, it reenters and idle state 722.

Disk Delayed Release Logic: The disk delayed release logic serves the purpose of allowing the disk to transfer sectors to and from the buffer in real-time, but delays the release of those sectors until validation by some later event. On read commands, the ECC processing causes the release (or validation) of the sector at a point in time later than the actual sector's data was transferred to the buffer. On write commands, it is the next nearest servo burst that provides the release for the prior sectors that are already in the buffer. In either case, it is necessary to have a real-time disk data pointer that points to the buffer location at which the disk pipe is actually working. Another disk data pointer will follow behind the real-time one to validate sectors in the buffer via a delayed signal from the disk hardware. The two disk data pointers will be called the Disk Release Data Pointer, and the Disk Real-time Data Pointer.

The Host Pipe

The host pipe is the host data transfer hardware that handles data transfers between the host and the data buffer. This hardware may be incorporated into the host DRAM port. At a given point in time, this block may be either reading or writing, and one buffer pointer may be required. The host pipe describes the operation of the host data transfer in relation to a specific extent and LBA chain. The host pipe operates in one extent of an LBA chain at any time. Host pipe transfers may be started by the firmware or by the hardware. On reads, cache hits are started automatically by the hardware. On cache misses, the firmware starts the host read transfer. On writes, the firmware starts the host transfer. The host pipe registers have ties into both the extent records and the LBA chain table. The host pipe registers can be used at any time, by the host, the cache, or the disk, to determine the current host activity in an LBA chain or an extent. The example below lists host pipe registers that may be included in a host pipe register set.

| Host Pipe Registers | Register Type | Access |
| --- | --- | --- |
| HostPipeControl | Input | Read/Write |
| HostPipeStatus | Output | Read only |
| LBAChainNumber | Input | Read/Write |
| StartingLBAInChain | Input | Read/Write |
| LBAOffsetInChain | Output | Read only |
| LBACount | Input | Read/Write |
| LBARemainingCount | Output | Read/Write |
| LBADoneCount | Output | Read only |
| StartingExtent | Output | Read only |
| ExtentNumber | Output | Read only |
| ExtentOffset | Output | Read/Write |
| ExtentBlockCount | Output | Read/Write |
| ExtentBlockRemainingCount | Output | Read/Write |
| ExtentBlockDoneCount | Output | Read only |

Every host pipe transfer has the input fields set in order to start. As the host pipe runs, the output registers are kept up to date by the host pipe hardware. The flowchart below shows how a host pipe transfer is started and executed by either firmware or hardware.

The HostPipeControl register contains bits that are used by the firmware to control the host pipe data transfers. The flag bits of this register are described below:

| HostPipeControl | | |
| --- | --- | --- |
| Bit # | Bit Name | Bit Description |
| 0 | StartTransfer | This bit is set by the hardware or firmware to issue a command to start a host pipe transfer for read or write. The host may automatically start a read transfer upon cache hit detection, but the firmware usually starts the write commands. |
| 1 | HostPipeWrite | This bit is set prior to setting the StartTransfer to tell the host pipe the direction of the data transfer. If set it is a write from host to buffer. This bit is mutually exclusive with the HostPipeRead bit. |
| 2 | HostPipeRead | This bit is set prior to setting the StartTransfer to tell the host pipe the direction of the data transfer. If set it is a read from buffer to host. This bit is mutually exclusive with the HostPipeWrite bit. |
| 3 | PauseAtNextBlock | This bit can be set by the firmware to pause the current host transfer at the next block boundary. This bit is only affective when the HostPipeActive bit is also set in the HostPipeStatus register. The firmware may use the PauseAtNextBlock bit if it needs to alter an extent in which the host is operating. If the firmware needs to modify an extent, it must pause the host transfer first, make its changes, and then resume the host transfer. When the transfer is paused, the HostPipeActive bit in the HostPipeStatus register remains set. During host pipe pauses, the firmware may modify host pipe registers in order to alter the extent chain. However, caution should be used to ensure proper operation after the transfer is resumed. |
| 4 | PauseAtNextExtent | This bit can be set by the firmware to pause the current host transfer at the next extent boundary. This bit is effective when the HostPipeActive bit is also set in the HostPipeStatus register. The firmware may use the PauseAtNextExtent bit if it needs to alter an extent in which the host is operating. If the firmware needs to modify an extent, it pauses the host transfer, makes its changes, and then resume the host transfer. When the transfer is paused, the HostPipeActive bit in the HostPipeStatus register remains set. |
| 5 | ResumeTransfer | This bit is set by the firmware to resume the current host transfer after it has already been paused by the firmware. This is effective when the TransferPaused bit in the HostPipeStatus register is set. |
| 6 | StopAtNextBlock | This bit is set by the firmware to halt a host transfer at the next block boundary. When the host transfer has stopped, all bits in the HostPipeStatus register will be cleared, and the firmware cleans up the LBA chain and the extent chain to reflect the host stoppage. |

The HostPipeStatus register contains read-only bits that are set and cleared by the hardware. This is an output register from the host pipe. The flag bits of this register are described below:

| HostPipeStatus | | |
| --- | --- | --- |
| Bit # | Bit Name | Bit Description |
| 0 | TransferPaused | This bit is set to indicate that the host pipe transfer is currently paused by either the PauseTransferAtNextExtent bit or the PauseTransferAtNextBlock bit set in the control register. This bit is cleared if the transfer is not paused, or if the transfer is resumed. Pausing the host pipe is useful when the firmware needs to modify the extent chain or LBA chain on which the host is currently active. This is done in a way that makes sure the host pipe transfer can resume operation with the necessary bookkeeping information. |
| 1 | HostPipeActive | This bit is set to indicate that the host pipe is currently transferring data to/from the buffer. This is a result of a host data transfer in progress. |
| 2 | HostWriteActive | This bit is set to indicate that a write is in progress. This is set if the HostPipeActive is also set. HostReadActive and HostWriteActive bits are mutually exclusive. |
| 3 | HostReadActive | This bit is set to indicate that a read is in progress. This is set if the HostPipeActive is also set. HostReadActive and HostWriteActive bits are mutually exclusive. |
| 4 | HostNoRoom | This bit is set to indicate if the host may continue data transfer in the current extent. This is a real-time bit, which is set and cleared based on the most current buffer block availability. |

The LBAChainNumber register is a register set by the firmware or hardware prior to starting a host transfer. This register is set by the host hardware in the event of an auto read transfer from a cache hit. Otherwise, the firmware sets this with the number of the LBA chain record before setting the StartTransfer bit in the HostPipeControl register.

The StartingLBAInChain register is an input register set by the firmware or hardware and specifies the desired start LBA for the host pipe transfer. This register is set prior to starting the host pipe transfer. The LBA specified should exist within the LBA chain specified in the LBAChainNumber register.

The LBACount register is an input register to the host pipe and specifies the desired number of LBAs to transfer. This register is set prior to starting the host pipe transfer. This register remains set with the total number of LBAs in the current host pipe transfer. It is not changed by the firmware or hardware once the transfer has begun.

The LBAOffsetInChain register is an output register set by the hardware upon the start of a host pipe transfer and updated by the hardware throughout the transfer. This register gets set initially to the difference between the desired start LBA (specified in StartingLBAInChain) and the actual first LBA of the LBA chain.

LBAOffsetInChain=StartingLBAInChain−LBAChain [LBAChainNumber].StartingLBA

After this initial setting, blocks released by the host causes this register to increment. This register should always reflect the current block offset in the LBA chain at which the host has last released.

The LBARemainingCount register is an output register from the host pipe hardware and specifies the number of blocks remaining in the current host transfer. The hardware sets this register when a transfer starts to the number of blocks in the transfer (i.e., LBACount). As the transfer progresses and blocks are released, this register is decremented until it reaches zero. As long as this count is non-zero, the HostPipeActive bit should remain set. On writes, this register is normally set to the LBAChainLength field of the LBA chain record. On reads, however, it may be set to some smaller value as a result of cache hits which only use a portion of the existing LBA chain.

The LBADoneCount register is an output register from the host pipe hardware and specifies how many blocks have been released by the host since the transfer was started. When the transfer is started this register is set to zero by the hardware. Then, as each block is released this register is incremented by the hardware. It reflects the current number of blocks completed by the host pipe.

The StartingExtent register is an output register from the host pipe hardware and it specifies the first extent number in which the transfer is to take place. It remains set throughout the host pipe transfer to the original starting extent number. The hardware sets this register upon starting the transfer to a value that is derived from traversing the extent chain pointed to by the LBA chain. The hardware uses the extent chain traverse to derive the starting extent number and extent offset. It then loads the StartingExtent, ExtentNumber, and ExtentOffset registers with the output of the extent chain traverse. The transfer is being done in the LBA chain specified by LBAChainNumber, and it is to begin at the LBA specified by StartingLBAInChain within that chain. The extent traverse may use as input the extent number at which to start traversing, the offset within that extent, and the number of blocks across the extent chain to traverse. The extent number at which to start is LBAChain[LBAChainNumber].StartingExtent. The offset within that extent at which to start the traverse is zero. The number of blocks to traverse across the extent chain is LBAOffsetInChain.

The ExtentNumber and ExtentOffset registers are output registers from the host pipe hardware and they specify the current extent number and block offset into the extent. The hardware initializes these registers at the same time that it loads the StartingExtent register. Subsequently, as blocks are released, the hardware updates the ExtentNumber and ExtentOffset registers. Internal values for the buffer block number and buffer block byte address are then computed from the extent information.

BufferBlockNumber=ExtentNumber→StartingBufferBlock+Block OffsetIntoExtent
BufferByteAddress=BufferBlockNumber*512

The ExtentBlockCount register is an output register from the host pipe and specifies the total number of blocks in the current extent. This value is computed by the hardware when ExtentNumber is set to a new extent.

ExtentBlockCount=Extent[NextHostExtent].Starting- BufferBlock−Extent[ExtentNumber].Starting- BufferBlock The ExtentBlockRemainingCount register is an output register from the host pipe and it specifies the number of blocks remaining to transfer in the current extent. Upon entering an extent, the hardware loads this register with ExtentBlockCount and then decrements it every time a block is successfully released.

The ExtentBlockDoneCount register is an output register from the host pipe and it specifies the number of blocks released in the current extent. Upon entering an extent, the hardware loads this register with zero and then increments it when a block is successfully released.

Host Pipe State Machine

State transitions may be caused by host pipe input registers, signals from other blocks, and host pipe output register values. Below is a list of the host pipe states and actions taken in each state.

Initialize:
   LBAChainNumber=#
   LBACount=#
   StartingLBAInChain=#
   HostPipeRead or HostPipeWrite=TRUE
ConnectToLBAChain:
   HostPipeActive=TRUE
   HostReadActive or HostWriteActive=TRUE
   LBAOffsetInChain=StartingLBAInChain−LBAChain.StartingLBA
   LBARemainingCount=LBACount
   LBADoneCount=0
DisconnectFromLBAChain:
   HostPipeActive=FALSE
   HostReadActive or HostWriteActive=FALSE
FirstExtent:
   StartingExtent=output of extent traverser
   ExtentNumber=StartingExtent
   ExtentOffset=output of extent traverser
   ExtentBlockCount=NextHostExtent.Starting Block−Starting Block
   ExtentBlockRemainingCount=minimum((ExtentBlockCount−ExtentOffset),
   LBARemainingCount)
   ExtentBlockDoneCount=0
NextExtent:
   ExtentNumber=NextHostExtent
   ExtentOffset=0
   ExtentBlockCount=NextHostExtent.StartingBlock−StartingBlock
   ExtentBlockRemainingCount=minimum(ExtentBlockCount, LBARemainingCount)
   ExtentBlockDoneCount=0

Figure 8:
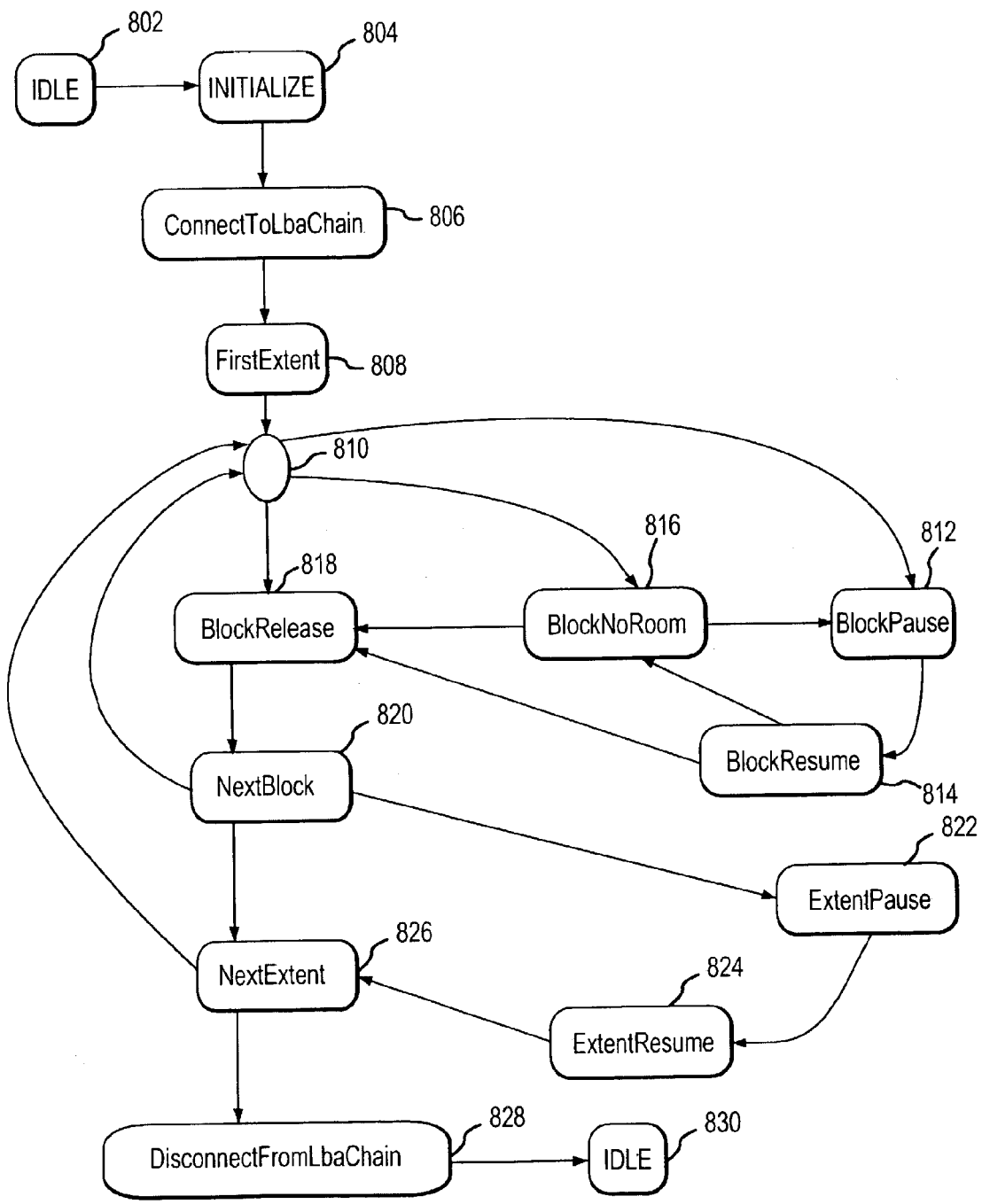
FIG. 8 shows a flowchart of state for a host pipe state machine according to an embodiment of the invention.

ExtentPause:
   TransferPaused=TRUE
ExtentResume:
   TransferPaused=FALSE
   PauseAtNextExtent=FALSE
BlockNoRoom:
   HostNoRoom=TRUE
BlockRelease:
   HostNoRoom=FALSE
NextBlock:
   LBAOffsetInChain++
   LBARemainingCount–
   LBADoneCount++
   ExtentBlockOffset++
   ExtentBlockRemainingCount–
   ExtentBlockDoneCount++
BlockPause:
   TransferPaused=TRUE
BlockResume:
   TransferPaused=FALSE
   PauseAtNextBlock=FALSE FIG. 8 is a host pipe state machine flowchart that shows the connections between the host pipe states from the list above. In this flowchart example, the host pipe state machine is in an idle state 802 until the initialize state 804 is activated and a transfer starts. Upon start of a transfer, the machine enters the ConnectToLBAChain state 806 followed by the FirstExtent state 808. One the First Extent has been identified in the FirstExtent state 708, the machine enters a conditional state 810, that may be under the control of the Host Room Logic.

The host room logic uses the LBA chain table, the extent records, and the host pipe registers to enable or disable host data transfers. The host room logic is the connection between the host and disk pipes that prevents loss of data or the transfer of invalid data between the host and the buffer DRAM. The host room logic looks at the disk pipe buffer pointer. The host pipe looks at the DiskReleaseDataPointer and the DiskActive bit to determine room. The disk pipe's release pointer is used in lieu of the disk pipe's real-time pointer.

The host pipe checks HostNoRoom prior to the transfer of a block. Once a block has begun transferring, it may be completed before HostNoRoom is checked again by the host pipe. If HostNoRoom is set during a host block transfer, it does not take affect until the host pipe attempts to transfer the next block.

The Boolean equation for HostNoRoom is:

HostNoRoom=HostReadActive & (DiskActive &
     (ExtentOffset≧DiskReleaseDataPointer.BlockOffset))|(!Disk
     Active & !DataValid))

DiskActive and DataValid refer to the extent pointed to by the host pipe ExtentNumber register.

The HostNoRoom checking is different for writes versus reads. With respect to HostNoRoom on write commands, there should always be room for host writes since host write commands originate the LBA chain and the extent chain. With respect to HostNoRoom on read commands, the host is about to start transfer in an extent and that extent has not yet been filled with valid read data by the disk pipe. The host and disk are active in the same extent and the host data pointer is greater or equal to the disk data pointer (i.e., the host is about to pass the disk in the same extent).

Referring back to FIG. 8, when the Host Room Logic determines that the HostNoRoom and PauseAtNextBlock conditions are true, the machine enters the BlockPause state 812 until there is a change in one of the conditions. When the PauseAtNextBlock condition changes to false then the machine may go from the BlockPause state 812 to the BlockResume state 814. Once in the BlockResume state 814 the Host Room Logic checks the HostNoRoom condition, and if HostNoRoom is true, then the machine enters the BlockNoRoom state 816. Alternatively, if the HostNoRoom condition is false, then the machine enters the BlockRelease state 818.

After the machine enters the BlockRelease state 818, the block is transferred and the machine enters the NextBlock state 820. In the NextBlock state 820, a determination is made about whether there are additional blocks to be released. If so, the machine goes back to the conditional state 810 to start the process of releasing the next block. If there are no more blocks to release in the extent, then the machine enters the NextExtent state 826.

In this example, when the Host Room Logic sets the PauseAtNextExtent condition to true, then the machine goes from the NextBlock state 820 to the ExtentPause state 822, when there are no more blocks to be released in the current extent. The machine stays in the ExtentPause state 822 until the PauseAtNextExtent condition is set to false, in which case the machine through the ExtentResume state 824 to the NextExtent state 826.

At the NextExtent state 826, a check is made whether there are any more extents to be transferred. If so, the machine reenters the conditional state 810 to start the process of transferring the next extent. Alternatively, if there are no more extents to transfer, the machine enters the DisconnectFromLBAChain state 828 and ultimately reenters an idle state 830.

Hit Detection Block

The hit detection block is a block that can recursively search the LBA chain table for the LBA and Length of incoming host commands. On host reads, the hit detection block ties the LBA chain table and the host pipe together to automate transfers of read hit data, even when the data is spread across more than one LBA chain. The hit detection uses the time-ordered organization of the LBA chain table to determine the most current cached blocks in the cases when one LBA appears in more than one LBA chain.

The search engine searches the LBA chain starting from the newest entry. Hit searches consists of tail hit detection, and head hit detection. Cache searches may be performed by both firmware and hardware. For host read transfers, the hit hardware continually searches the LBA chain table for pieces of the requested host LBA chain. Every piece found is transferred, and a new search begins when that piece has finished, until all of the blocks requested have been found and transferred. In the case of cache misses, the cache firmware will append a new LBA chain as the newest entry in the LBA chain table, and request the disk to fill that entry with the missing read data. The host engine will find this LBA chain after the cache firmware creates it, and attach the host pipe to it for transfer as the blocks become available.

An exception case may arise when there is an ATA interface requirement. When the ATA interface is configured to use "multiple mode" for transfers, the minimum transfer size is a number of blocks specified by the multiple mode that was requested. This number of blocks is a power of 2 (i.e. 2, 4, 8, 16, . . . ). When the host is doing multiple mode reads a cache hit is, at minimum, the number of blocks in a multi-block unit.

Inputs into the hit detection hardware may include:

LBA—the starting LBA number for which to search.

Length—the number of continuous blocks starting at LBA.

Outputs from the hit detection hardware may include:

MissLBA—the first LBA that does not exist in cache after having completed both the recursive head hit detection and recursive tail hit detection searches MissLength—the number of continuous blocks starting at MissLBA that do not exist in cache after having completed both the recursive head hit detection and recursive tail hit detection searches LBA chainEntry—the number of the LBA chain entry of the first LBA detected as a hit. This is used by the firmware to locate a particular LBA within the LBA chain table entries (the newest one).

HeadHitFlag—a bit to indicate if there was a head hit

TailHitFlag—a bit to indicate if there was a tail hit

FullHitFlag—a bit to indicate if there was a full hit

SearchInProgress—a bit to indicate that there is a cache search in progress

SearchDone—a bit to indicate that a cache search has completed

Figure 9:
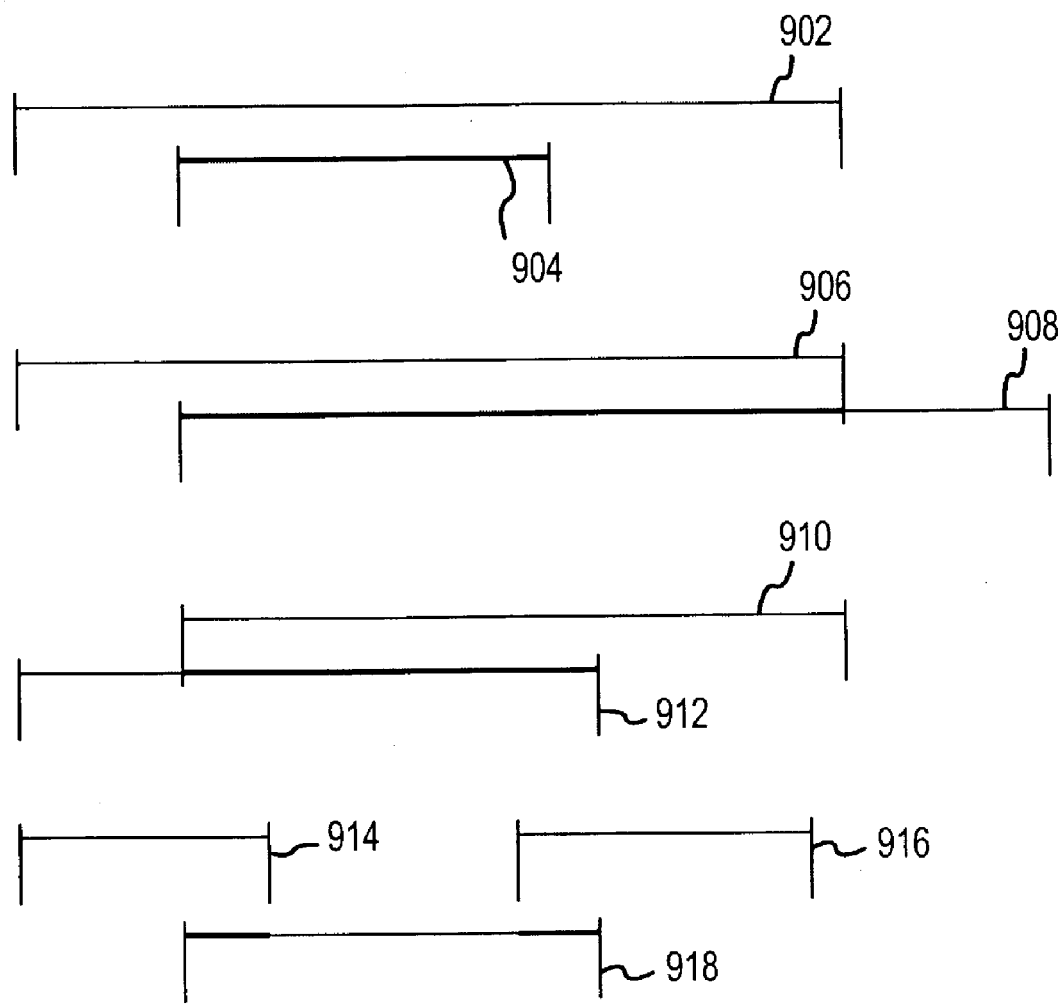
FIG. 9 shows examples of some types of cache hits.

Referring now to FIG. 9, examples cache hit scenarios that can occur during hit detection are shown. The first example is a full hit where the host request 904 is completely covered by the cached data 902. Another hit scenario is a head hit where the top of the host request 908 is covered by cached data 906, but the back section of the host request 908 is not covered. Stile another scenario is a tail hit where the host request 912 is covered by the cached data 910, but the initial data sections of the request 912 are not in the cache. Still another scenario is called a head and tail hit where the host request 918 hits two sections of cached data 914 and 916, but the middle of the host request 918 is not covered by the cache data.

Extent Chain Reset:

When the firmware allocates an extent chain for read/write, or de-allocates a chain for freeing resources, the flag bits are cleared in all extents in the chain. The firmware will write the starting extent number to a location, and then set a bit to indicate a reset host extent chain, or reset disk extent chain command. An ExtentChainResetDone bit indicates that the hardware has traversed through the extent chain and cleared all of the status bits. If it was a disk extent reset, then the disk next extent pointer is used for the traverse. If it was a host extent reset, then the host next extent pointer is used for the traverse.

Inputs for the Extent Chain Reset include:

TraverseType—may be Host for a host traverse, or Disk for a disk traverse.

FirstExtentInChain—the extent number of the first extent at which to start.

The output from the Extent Chain Reset includes the ExtentChainResetDone, which is a bit to indicate that the bit clearing has completed in all the extents in the chain traversed by the specified TraverseType.

Extent Chain Traverse

The firmware may need to traverse forwards and backwards through an extent chain rather frequently. Depending on the length of a chain, this would be time consuming to perform in firmware. Therefore, there may be a hardware implementation of extent traversing. There may also be two separate extent chain traverses, one for the hardware, and one for the firmware. Below is a table of registers for the each extent traverse hardware block.

| Extent Traverse Registers | Register Type | Access |
|---|---|---|
| ExtentTraverseControl | Input | Read/Write |
| ExtentTraverseStatus | Output | Read only |
| NumberOfBlocksToTraverse | Input | Read/Write |
| TraverseStartExtent | Input | Read/Write |
| TraverseStartOffset | Input | Read/Write |
| TargetExtentNumber | Output | Read only |
| TargetPreviousExtentNumber | Output | Read only |
| TargetExtentOffset | Output | Read only |

The Extent Traverse Registers may be defined as follows:

The ExtentTraverseControl register can be described by the following table:

| Bit # | Field Name | Bit Description |
|---|---|---|
| | | ExtentTraverseControl |
| [0–1] | TraverseType | 0 = Host traverse, 1 = Disk Traverse, 2 = Buffer Traverse |
| 2 | StartTraverse | Set to initiate the traverse. Set after all other inputs are set. |

The ExtentTraverseStatus register can be described by the following table:

| | | ExtentTraverseStatus |
|---|---|---|
| Bit # | Field Name | Bit Description |
| 0 | TraverseInProgress | Set to indicate that extent traverse is busy |
| 1 | TraverseDone | Set to indicate that extent traverse is done |

The NumberOfBlocksToTraverse register is set to the total number of blocks to traverse through in the extent chain. This is set as in input prior to setting the StartTraverse bit in the ExtentTraverseControl register.

The TraverseStartExtent register is set to the first extent in the chain at which to begin the traverse. This is set as in input prior to setting the StartTraverse bit in the ExtentTraverseControl register.

The TraverseStartOffset register is set to the block offset within the first extent of the chain at which to begin the traverse. This is set as in input prior to setting the StartTraverse bit in the ExtenTraverseControl register.

The TargetExtentNumber register is an output from the extent traverse to indicate the extent number found after traversing the specified number of blocks in the extent chain.

The TargetPreviousExtentNumber register is an output from the extent traverse to indicate the extent number prior to the extent number found after traversing the specified number of blocks in the extent chain.

The TargetExtentOffset register is an output from the extent traverse to indicate the final block offset within the extent number found after traversing the specified number of blocks in the extent chain.

Buffer Scratch Pad

In an embodiment of the invention, there is provided a buffer scratch pad for assisting in the operation of chunks of data in the data buffer. The buffer scratch pad may have two memory pointers, and a size. One memory pointer locates the window in buffer memory, and the other pointer locates the scratchpad area in internal RAM. When given a scratchpad read command, the hardware would copy the contents of the buffer DRAM located at the window into the scratchpad area in internal RAM. A "done" bit would indicate the scratchpad is current with the buffer DRAM. The firmware could then do reads and writes to any data inside the scratchpad with much higher performance. Later, the firmware could issue a scratchpad write command to update the buffer DRAM with the block of data that has been modified.

Hardware Estimates

The internal memory requirements for the extented cache implementation depend on the table sizes, record sizes, and the size of the DRAM to be supported. Here are some initial estimates assuming support for a 64 Mbit DRAM like in the example described.

| Block Name | Number of Records | Number of Bytes |
|---|---|---|
| LBA Chain Table | 48 | 480 bytes |
| Track Section Table | 128 | 1120 bytes |
| Extent Allocation Table | 256 | 1664 bytes |
| TOTAL | | 3264 bytes |

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

We claim:

1. A data storage system for improved data storage and retrieval, comprising:
    a data buffer; and
    a memory device associated with the data buffer, the memory device storing an extent record comprising:
        a host pointer that links the extent record to a next host extent record of a host extent record set; and
        a storage device pointer that links the extent record to a next storage device extent record of a storage device extent record set,
        wherein the host extent record set and the storage device extent record set share at least one extent record and wherein the host extent record set has at least one extent record that is not in the storage device extent record set.

2. The extent record of claim 1, wherein the host extent record set and the storage device extent record set comprise two or more extent records.

3. The extent record of claim 1, wherein the host extent record set defines locations of non-sequential extents in the data buffer.

4. The extent record of claim 3, wherein non-sequential extents comprise host LBA chain data from a host.

5. The extent record of claim 4, wherein said host is a computer.

6. The extent record of claim 1, wherein the storage device extent record set defines locations for non-sequential extents in the data buffer.

7. The extent record of claim 6, wherein the non-sequential extents comprise track section data from a storage device.

8. The extent record of claim 7, wherein the storage device is a hard disk.

9. A system for transferring data between a host and a storage device comprising:
    a data buffer coupled to the host and the storage device, wherein memory in the data buffer is divided into one or more extents of variable size and comprising a set of one or more sequential buffer blocks;
    an extent table associated with the data buffer, wherein the extent table comprises an extent record for each of the extents in the data buffer, the extent record storing information defining a first buffer block in an extent and providing a pointer to a next one of the extent records associated with data transfer for the host and a pointer to a next one of the extent records associated with a disk track transfer for the storage device;
    an LBA chain table coupled to the host and the extent table comprising entries mapping one or more LBAs for the host data transfer to the extent records; and
    a track section table coupled to the storage device and the extent table comprising entries mapping disk sections of the storage device for the disk track transfer to the extent records.

10. The system of claim 9 wherein the mapping to the extent records differs between the LBA chain table and the track section table for a data transfer for a particular one of the LBAs.

11. The system of claim 10, further comprising a host pipe coupled to the host and the data buffer, and wherein the host pipe is coupled to the LBA chain table.

12. The system of claim 9 comprising a disk pipe coupled to the storage device and the data buffer.

13. The system of claim 12, wherein the disk pipe is coupled to the track section table.

14. The system of claim 9 comprising a buffer manager coupled to the data buffer.

15. The system of claim 14 comprising a hit detector coupled to the buffer manager, wherein the hit detector measures cache hits in the LBA chain table.

16. The system of claim 9, wherein the host is a computer.

17. The system of claim 9, wherein the storage device is a hard disk.

* * * * *